US009218384B2

(12) United States Patent
Shimizu

(10) Patent No.: US 9,218,384 B2
(45) Date of Patent: Dec. 22, 2015

(54) EVALUATION METHOD AND INFORMATION PROCESSING APPARATUS

(71) Applicant: FUJITSU LIMITED, Kawasaki-shi, Kanagawa (JP)

(72) Inventor: Toshihiro Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 13/960,439

(22) Filed: Aug. 6, 2013

(65) Prior Publication Data

US 2014/0059063 A1 Feb. 27, 2014

(30) Foreign Application Priority Data

Aug. 27, 2012 (JP) ................................ 2012-186316

(51) Int. Cl.
*G06F 17/30* (2006.01)

(52) U.S. Cl.
CPC .... *G06F 17/30345* (2013.01); *G06F 17/30864* (2013.01); *G06F 17/30958* (2013.01)

(58) Field of Classification Search
USPC ......................................... 707/726, 748–750
See application file for complete search history.

(56) References Cited

U.S. PATENT DOCUMENTS

| 6,285,999 | B1 | 9/2001 | Page | |
|---|---|---|---|---|
| 7,346,621 | B2* | 3/2008 | Zhang | G06F 17/30864 707/802 |
| 8,843,477 | B1* | 9/2014 | Tirumalareddy | G06F 17/30 707/706 |
| 8,929,669 | B2* | 1/2015 | Yabu | 382/225 |
| 2004/0117290 | A1* | 6/2004 | Shacham | 705/37 |
| 2004/0220963 | A1* | 11/2004 | Chen | G06F 17/30707 |
| 2005/0234972 | A1* | 10/2005 | Zeng | G06F 17/30864 |
| 2006/0036591 | A1* | 2/2006 | Gerasoulis | G06F 17/30595 |
| 2007/0150467 | A1* | 6/2007 | Beyer | G06F 17/30672 |
| 2008/0114753 | A1* | 5/2008 | Tal-Ezer | G06F 17/30864 |
| 2008/0161885 | A1* | 7/2008 | Hsu | G06F 3/061 607/60 |
| 2009/0006469 | A1* | 1/2009 | Jain et al. | 707/104.1 |
| 2009/0048933 | A1* | 2/2009 | Cho | G06Q 30/0257 705/14.55 |
| 2009/0112843 | A1* | 4/2009 | Hsu | G06F 17/30011 |
| 2009/0240682 | A1* | 9/2009 | Balmin | G06F 17/30554 |
| 2010/0114587 | A1* | 5/2010 | Masuyama | G06Q 50/18 705/1.1 |
| 2011/0040717 | A1* | 2/2011 | Rho | G06F 17/30864 706/50 |
| 2011/0060746 | A1* | 3/2011 | Dalvi et al. | 707/750 |
| 2011/0125803 | A1* | 5/2011 | Asahi | G06T 11/206 707/797 |
| 2012/0221578 | A1* | 8/2012 | Kim | G06Q 10/10 707/748 |
| 2013/0218899 | A1* | 8/2013 | Raghavan | G06F 17/30958 707/741 |
| 2013/0275429 | A1* | 10/2013 | York et al. | 707/737 |
| 2014/0229493 | A1* | 8/2014 | Hong | G06F 17/30864 707/748 |

FOREIGN PATENT DOCUMENTS

| JP | 2008-26968 | 2/2008 |
|---|---|---|
| JP | 2008-27398 | 2/2008 |

OTHER PUBLICATIONS

Patent Abstracts of Japan, Publication No. 2008-026968, Published Feb. 7, 2008.
Patent Abstracts of Japan, Publication No. 2008-027398, Published Feb. 7, 2008.
Yamada et al., "Efficient Collection Strategies of Important Web Pages by Incremental PageRank," Information Processing Society of Japan (IPSJ) Journal: Computing System, Information Processing Society of Japan, vol. 45, No. SIG 11, Oct. 2004, pp. 465-473.
Page et al., "The PageRank Citation Ranking: Bringing Order to the Web," The Stanford University InfoLab, Jan. 1998, pp. 1-17, [online: Feb. 23, 2012, http://ilpubs.stanford.edu:8090/422/1/1999-66.pdf].

* cited by examiner

*Primary Examiner* — Hanh Thai
(74) *Attorney, Agent, or Firm* — Staas & Halsey LLP

(57) ABSTRACT

A memory stores a plurality of data objects and their respective evaluation scores. A processor is configured to update, in response to an update made to a first data object, evaluation values of one or more second data objects linked from at least the first data object, based on the evaluation score of the first data object. In response to a reference request for one data object, the processor determines the evaluation score of the requested data object, based on the evaluation scores of one or more third data objects having a link to the requested data object.

7 Claims, 17 Drawing Sheets

EXAMPLE OF DIRECTED GRAPH

EXAMPLE OF GRAPH STRUCTURE OF WEB PAGES

FIG. 6

| WEB PAGE MANAGEMENT TABLE | | | | 111 |
|---|---|---|---|---|
| URL | RANK | FORWARD LINK | BACKLINK | |
| P1 | 0.01 | P2, P3 | P21, P22 | |
| P2 | 0.02 | P4, P5 | P1, P31, P32 | |
| P3 | 0.01 | P5, P6 | P1, P41, P42 | |
| ... | ... | ... | ... | |

EVALUATION METHOD AND INFORMATION PROCESSING APPARATUS

CROSS-REFERENCE TO RELATED APPLICATION

This application is based upon and claims the benefit of priority of the prior Japanese Patent Application No. 2012-186316, filed on Aug. 27, 2012, the entire contents of which are incorporated herein by reference.

FIELD

The embodiments discussed herein relate to an evaluation method and an information processing apparatus.

BACKGROUND

An information processing apparatus may access another apparatus via a network to browse some data objects (e.g., document data) stored in that apparatus. As the amount of stored data grows, it takes more time and effort for users to reach their desired data objects. A data search system may therefore be used to aid the users. For example, a data search system accepts input of one or more keywords from a user and retrieves data objects containing the exact keywords or relating to the keywords.

Web pages are an example of such document data. Some web page search engines are designed to present a list of web pages with their ranking information. The ranks of web pages represent their popularity, importance, or other properties. Search engines may arrange the found web pages in descending order of the ranks, so that the web pages with higher rank values will be seen at upper locations.

PageRank (registered trademark of Google Inc.) is known as an algorithm for ranking web pages. A web page may have some links pointing to other web pages. The PageRank algorithm determines the relative positions of web pages on the basis of their backlinks and forward links. Here the term "backlink" refers to a link received by a web page from another web page. The term "forward link" refers to a link embedded in a web page which points to another web page. The link relationships among web pages may be represented by, for example, an adjacency matrix. Actually, what is done to determine the ranking of web pages with PageRank is to solve an eigenvector problem of an adjacency matrix (or modified adjacency matrix). For example, the eigenvector of a matrix may be calculated by using an algorithm called the power method.

Because the number of web pages is enormous, the PageRank method would take a long time to calculate the ranks of all web pages with accuracy. To reduce the computational cost, one proposed method calculates approximate ranks, instead of the exact ranks. The proposed method equally divides and distributes an approximate PageRank value of a collected web page to other pages to which it links. This distribution to linked pages is repeated over and over at each receiving page. Reduction of computational costs is achieved by discontinuing the repetition when an appropriate limit is reached.

The following is an example of related documents:
U.S. Pat. No. 6,285,999, Specification
Page et al., "The PageRank Citation Ranking: Bringing Order to the Web.," [online], Oct. 30, 2001, The Stanford University InfoLab, [Found on Feb. 23, 2012], Internet "URL: http://ilpubs.stanford.edu:8090/422/1/1999-66.pdf"

Yamada et al., "Efficient Collection Strategies of Important Web Pages by Incremental PageRank," IPSJ Journal: Computing System, Information Processing Society of Japan, October 2004, Vol. 45, No. SIG 11, p. 465-473

As described above, there is a method for determining evaluation scores (e.g., ranks) of a plurality of data objects (e.g., documents) based on evaluation scores of other data objects, as well as on their links. The method updates the evaluation scores by repetitively redistributing a change in the scores from one data object to linked data objects until the update reaches an appropriate midway point.

The above method permits the effect of an update of evaluation scores to propagate through the links of data objects. This propagation, however, takes place only in a limited range because it is interrupted midway. Evaluation scores of data objects outside the range could therefore be inaccurate due to the lack of influence from their related data objects. Without compensation for this lack of influence, such an inaccurate score would simply be retrieved in response to a reference request.

SUMMARY

According to an aspect of the embodiments to be discussed herein, there is provided an evaluation method for determining an evaluation score of one data object based on evaluation scores of and links in related data objects, the links each permitting one data object to point to another data object. This evaluation method includes: updating, by a processor and in response to an update made to a first data object, the evaluation values of one or more second data objects linked from at least the first data object, based on the evaluation score of the first data object; and determining, by the processor and in response to a reference request for one data object, the evaluation score of the requested data object, based on the evaluation scores of one or more third data objects having a link to the requested data object.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a web page management table according to the second embodiment;

DESCRIPTION OF EMBODIMENTS

Several embodiments will be described below with reference to the accompanying drawings.

(a) First Embodiment

Figure 1:
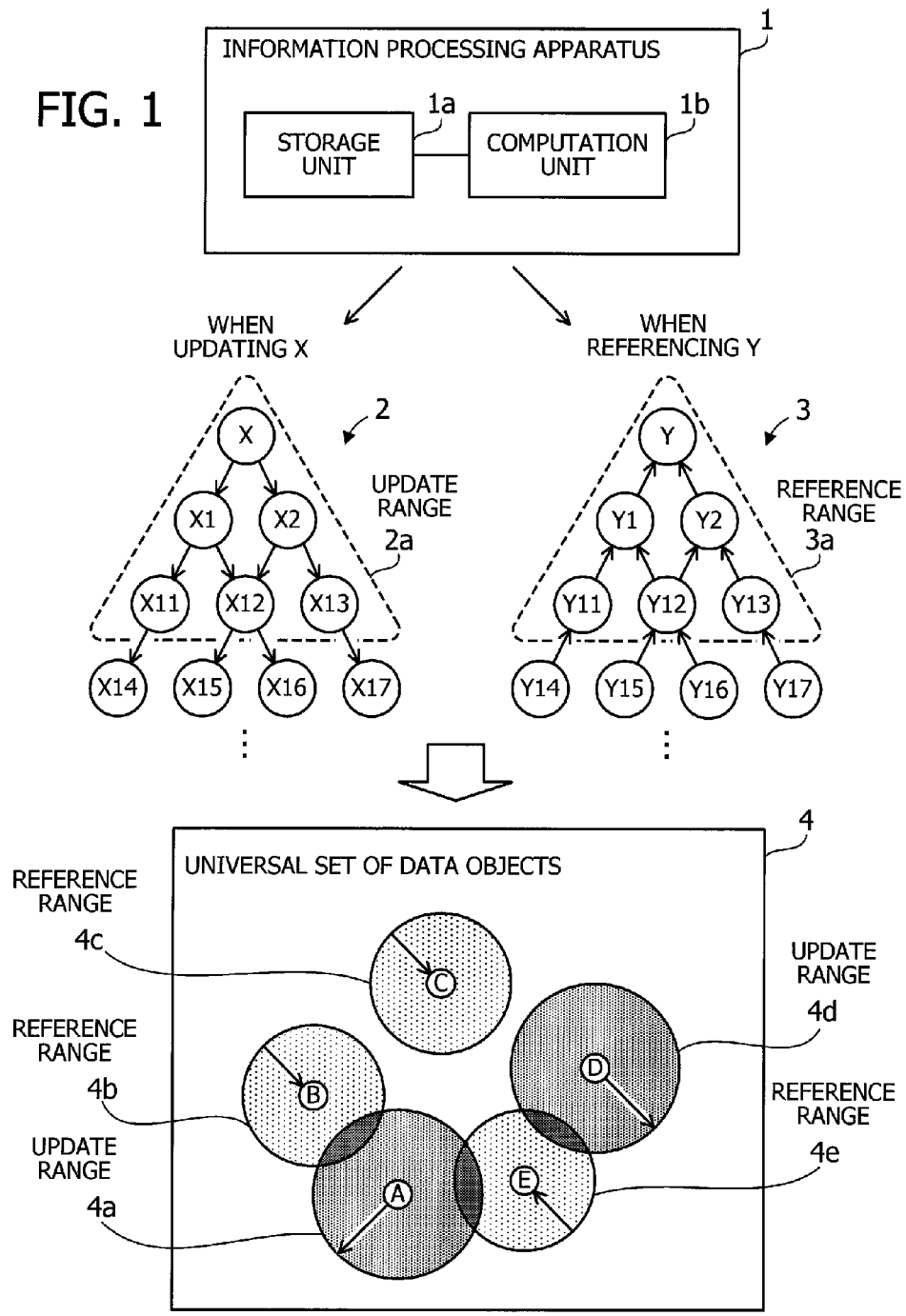
FIG. 1 illustrates an information processing apparatus according to a first embodiment.

FIG. 1 illustrates an information processing apparatus according to a first embodiment. The illustrated information processing apparatus 1 is used to determine evaluation scores of a plurality of data objects interrelated by their links. Each link permits one data object to point to another data object. The term "data object" is used herein to denote, for example, document data such as web pages written in the form of Hypertext Markup Language (HTML) files. Links in a web page are described as Uniform Resource Locator (URL) in its hypertext structure. Such links may also be called "hyperlinks." For example, a scholarly paper contains links in its text to cite other papers as reference documents. Note that the document data is not limited to documents per se, but can be other things as long as their identifiers and links can be managed properly. Also, the data objects discussed herein may be other kind of data objects than documents having link information.

The illustrated information processing apparatus 1 determines evaluation scores of each of a plurality of data objects, based on evaluation scores and links of related data objects. The term "evaluation score" is used herein to refer to the ranking of, for example, popularity, importance, recommendation, or the like. More specifically, the evaluation score of a data object is distributed to other data objects linked from that data object. When one data object receives such distributed evaluation scores from two or more linking data objects, their whole sum is assigned to the linked data object as its evaluation score. The evaluation score of one receiving data object is further distributed to other data objects linked therefrom. This repetitive distribution permits a plurality of related data objects to obtain their respective evaluation scores.

The information processing apparatus 1 includes a storage unit 1a and a computation unit 1b. The storage unit 1a may be a memory device such as a random access memory (RAM), and the computation unit 1b may be a processor device such as a central processing unit (CPU). For example, data processing operations of the first embodiment are realized by causing the computation unit 1b to execute a program stored in the storage unit 1a.

The storage unit 1a also stores a plurality of data objects and their respective evaluation scores. As noted above, one data object may have one or more links to other data objects. For example, the storage unit 1a stores a plurality of data objects X, X1, X2, X11, X12, X13, X14, X15, X16, X17, and so on. Data object X has links to data objects X1 and X2. Data object X1 has links to data objects X11 and X12. Data object X2 has links to data objects X12 and X13. The data object X11 has a link to data object X14. Data object X12 has links to data objects X15 and X16. Data object X13 has a link to data object X17. These link relationships among the data objects are depicted as a graph structure 2 in FIG. 1.

The storage unit 1a further stores, for example, data objects Y, Y1, Y2, Y11, Y12, Y13, Y14, Y15, Y16, Y17, and so on. Data objects Y1 and Y2 have links to data object Y. Data object Y1 has a link to data object Y1. Data object Y12 has links to data objects Y1 and Y2. Data object Y13 has a link to data object Y2. Data object Y14 has a link to data object Y11. Data objects Y15 and Y16 each have a link to data object Y12. Data object Y17 has a link to data object Y13. These link relationships among the data objects are depicted as another graph structure 3 in FIG. 1.

When an update of evaluation score occurs to a first data object, the computation unit 1b reevaluates and updates the evaluation score of each of one or more second data objects linked from at least the first data object, based on the evaluation score of the first data object. The computation unit 1b performs this operation with reference to the storage unit 1a.

Suppose, for example, that the evaluation value of data object X is updated. More specifically, data object X may gain a new link from some other object. This change raises the evaluation score of data object X because data object X can receive an additional evaluation score from that new data object. In another case, an existing link to data object X may be deleted from some other data object. This change reduces the evaluation score of data object X because data object X loses the currently distributed evaluation score of that linking data object.

In the illustrated case, the above update made to data object X causes the computation unit 1b to reevaluate and update the evaluation scores of data objects X1 and X2 linked from data object X. This reevaluation and update processing may further extend to, for example, data objects X11, X12, and X13 linked from data objects X1 and X2. In the case where the evaluation score of data object X has increased, the increase is distributed to the linked data objects X1 and X2. The distributed evaluation score of each data object X1 and X2 is further distributed over data objects X11, X12, and X13, when these data objects are eligible for such distribution. By repeating distribution of scores in this way, the effect of an increase in the evaluation score of data object X propagates to other data objects through their links.

The degree of influence that one data object exerts on other data objects at the time of its update is referred to as an "update-time influence." For example, the update-time influence of data object X is expressed as the ratio of a resulting change in evaluation score of other data objects against the original change in evaluation score of data object X. For example, when the update-time influence of data object X on data object X11 is 25% (or 0.25), it means that the latter data object X11 is to receive 25% of the amount of change in the evaluation score of the former data object X.

Referring to the example of FIG. 1, data object X distributes its increase to two linked data objects X1 and X2. That is, the influence over data objects X1 and X2 is ½ or 0.5 for each, with respect to a one-unit increase of evaluation scores. Data object X1 further distributes its increase to other two data object X11 and X12. The influence to each of these data objects X11 and X12 amounts to 0.5×0.5, or 0.25. This distribution of evaluation scores similarly applies to the case of a decrease in the evaluation score of data object X. It is also noted that the concept of update-time influence applies not only to increased evaluation scores, but to decreased evaluation scores as well.

An update range 2a is defined herein as a set of data objects to be influenced by an update. Specifically, the update range 2a is determined with an influence threshold $\epsilon$ for updating, where $\epsilon$ is a real number in the range of $0<\epsilon<1$. This update-time influence threshold indicates up to which data objects the effect of an update is supposed to propagate. For example, the update range 2a denotes a set of data objects whose update-time influence is greater than or equal to the threshold C.

The computation unit 1b may further receive a request for referencing an evaluation score of a specific data object. In response to this reference request, the computation unit 1b determines the evaluation score of the requested data object, based on the evaluation scores of one or more third data objects having links to at least the requested data object.

For example, upon receipt of a reference request for the evaluation score of data object Y, the computation unit 1b determines the evaluation score of the requested data object Y, based on the evaluation scores of data objects Y1 and Y2 having links to at least the data object Y in question. Suppose now that these data objects Y1 and Y2 are the only data objects that have links to data object Y, and that these links are the only links that the data objects Y1 and Y2 have. If the evaluation score of data object Y is determined only from those of data objects Y1 and Y2 in this case, the evaluation score of data object Y equals to the sum of the evaluation scores of data objects Y1 and Y2.

The evaluation score of data object Y may also be determined from evaluation scores of data objects Y11, Y12, and Y13, in addition to those of data objects Y1 and Y2. For example, evaluation scores of data objects Y11, Y12, are Y13 influence the data object Y in question via intervening data objects Y1 and Y2. The degree of influence that some data objects exert on another data object at the time of referencing is referred to as a "reference-time influence." For example, the reference-time influence of data object Y is expressed as the ratio of how much part of evaluation scores of other data objects affects the evaluation score of data object Y. For example, data object Y11 has a reference-time influence of 40% (=0.4) over data object Y11 when 40% of its evaluation score reflects upon the evaluation score of data object Y. The evaluation score of data object Y may be determined on the basis of such a reference-time influence and the evaluation score of each relevant data object Y1, Y2, Y11, Y12, and Y13.

A reference range 3a is defined herein as a set of data objects to be actually referenced upon reference request for a data object. Specifically, this reference range 3a is determined by using an influence threshold $\epsilon'$ for referencing, where $\epsilon'$ is a real number in the range of $0<\epsilon'<1$. For example, the reference range 3a is a set of data objects whose reference-time influence is greater than or equal to the threshold $\epsilon'$.

In the above-described information processing apparatus 1, the computation unit 1b operates with a storage unit 1a to update evaluation scores of data objects X1 and X2 linked from at least data object X, based on a new evaluation score of data object X. The computation unit 1b is also responsive to a reference request for data object Y. In response, the computation unit 1b determines and outputs a new evaluation score of data object Y based on the evaluation score of each data object Y1 and Y2 having links to at least the data object Y.

The above-described features make it possible to enhance the reliability of data evaluation, besides reducing computational costs for updating evaluation scores. More specifically, setting an update range 2a means limiting the propagation of influence in the course of updating evaluation scores of data objects. Although it reduces the computational cost, the limited range of influence would degrade the accuracy of evaluation scores outside the update range 2a. The computation unit 1b could respond to a reference request for such a data object outside the update range 2a by simply retrieving the requested score from the storage unit 1a. However, the evaluation score would be less reliable because of the above reasons.

In view of the above, the proposed information processing apparatus 1 is designed to determine the evaluation score of a referenced data object, taking into consideration of evaluation scores of other data objects in a reference range 3a of the data object in question. That is, the evaluation score of the requested data object is re-evaluated based on the evaluation scores of its surrounding data objects. Even if the requested data object has missed the chance of being influenced by update in other data objects, the effect of that update is likely to have reached some of its surrounding data objects. When this is the case, the proposed information processing apparatus 1 can make the update reflect in the evaluation score that it outputs for the requested data object.

More specifically, suppose that the universal set 4 of data objects includes data objects A, B, C, D, and E. When the evaluation score of one data object A is updated, its surrounding objects (i.e., other data objects in its update range 4a) are also subjected to the update. When the evaluation score of another data object B is referenced, its surrounding data objects (i.e., other objects in its reference range 4b) are referenced so that their evaluation scores are taken into consideration in determining the evaluation score of the data object B in question. Although the update of data object A has not influenced data object B per se, the evaluation scores of data objects that belong to both the update range 4a and reference range 4b are reflected in the resulting evaluation score of data object B.

When the evaluation score of yet another data object C is referenced, the surrounding data objects in its reference range 4c are actually referenced to determine the evaluation score of the data object C in question. Since these surrounding data objects have not been influenced by the update of data object A, there is no need for consider their influence on the evaluation score of data object C. In other words, there has been no significant update in the data objects contained in the reference range 4c. Accordingly, the evaluation score of data object C can be determined with a sufficient reliability, even though it is based only on the evaluation scores of its surrounding data objects.

Similarly to the above, an update to the evaluation score of data object D affects other objects in its update range 4d. When the evaluation score of another data object E is referenced, the surrounding data objects in its reference range 4e are actually referenced to determine the evaluation score of the data object E in question. Although the updates of data objects A and D have not influenced data object E per se, the evaluation scores of data objects belonging to both the update range 4d and reference range 4e are reflected in the evaluation score of data object E.

In this way, the first embodiment reduces computational costs for updating web page ranks by limiting the propagation range of an updated evaluation score of a data object. Although some of the linked data objects are excluded from the effect of the update, the first embodiment compensates it and ensures the reliability of their evaluation scores when they are referenced.

(b) Second Embodiment

Figure 2:
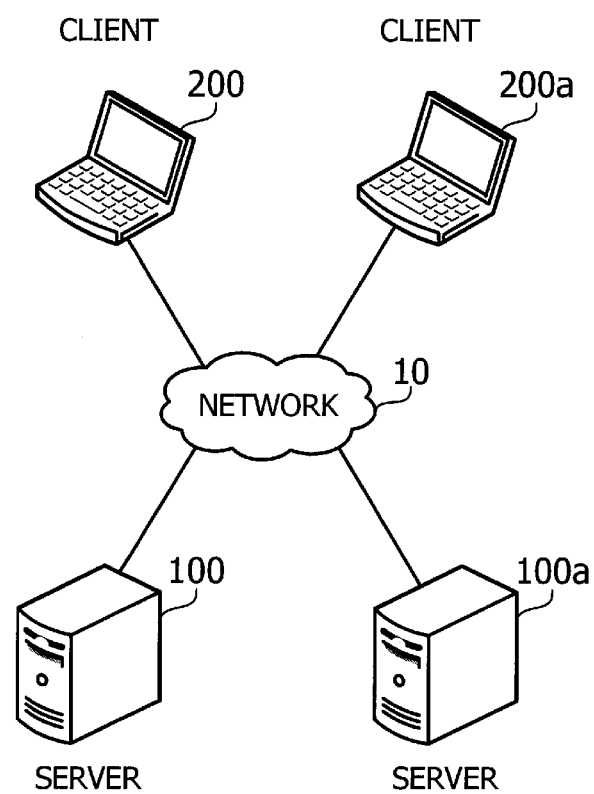
FIG. 2 illustrates an information processing system according to a second embodiment.

FIG. 2 illustrates an information processing system according to a second embodiment. This information processing system determines the ranking of web pages. Specifically, the illustrated information processing system includes servers 100 and 100a and clients 200 and 200a. The servers 100 and 100a and clients 200 and 200a are connected with each other via a network 10. The network 10 may be, for example, the Internet or other wide area network (WAN). Alternatively, the network 10 may be a local area network (LAN).

The servers 100 and 100a are computers configured to determine the ranking of web pages. The servers 100 and 100a receive information from clients 200 and 200c about what update (e.g., increase or decrease of ranks) has been made to a specific web page. In response, the servers 100 and 100a cause the effect of that update to propagate from the updated web page to other web pages linked therefrom, thus changing the evaluation scores of those influenced web pages.

The servers 100 and 100a also receive a reference request from clients 200 and 200a for the rank of a specific web page. In response, the servers 100 and 100a evaluate the rank of the referenced web page and return the result to the clients 200 and 200a.

The servers 100 and 100a share the load of managing the entire set of web pages. For example, one server 100 holds data about ranks and the like of some of those web pages. The other server 100a holds the same for the remaining web pages. While only two servers are illustrated in FIG. 2, the management of web pages may be done by three or more such server computers.

When, for example, a need arises in one server 100 to update some data managed in the other server 100a, the former server 100 requests the latter server 100a to do so. Or, when one server 100 has to use some data managed in the other server 100a, the former server 100 obtains the data from the latter server 100a. The same applies the other way around.

The clients 200 and 200a are client computers operated by users. In accordance with user commands, the clients 200 and 200a send the servers 100 and 100a update requests or reference requests concerning the ranking of web pages.

Figure 3A:
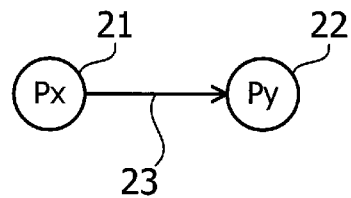
FIGS. 3A and 3B are exemplary graphs according to the second embodiment.
Figure 3B:
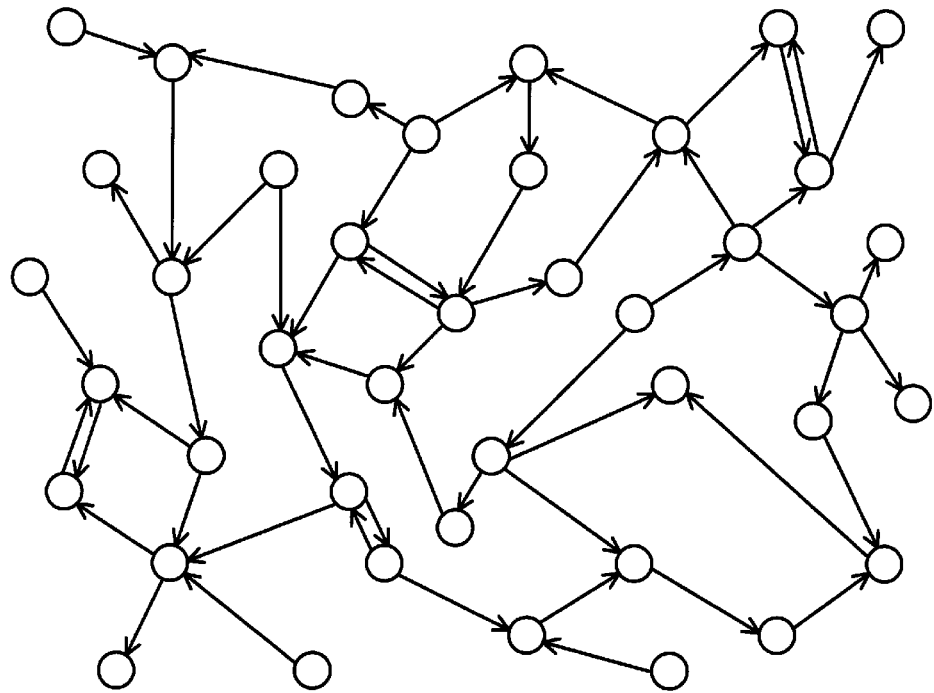

FIGS. 3A and 3B are exemplary graphs according to the second embodiment. FIG. 3A exemplifies a directed graph. This directed graph is formed from nodes 21 and 22 and an arrow 23. Each node 21 and 22 represents a single data object (or record). In the second embodiment, the nodes 21 and 22 respectively represent web pages Px and Py, which are document data objects written in HTML. The graph of FIG. 3A includes a link from one web page Px to another web page Py, which is actually a hypertext element specifying the URL of web page Py.

The arrow 23 represents the above-described link from node 21 to node 22. One node 21 serves as the originating point of the arrow 23; the arrow 23 is referred to as a "forward link" of the node 21. Another node 22 serves as the terminal point of the arrow 23; the arrow 23 is referred to as a "backlink" of the node 22. As can be seen from this example, a link relationship between two web pages is represented in the form of a graph structure composed of nodes 21 and 22 and an arrow 23.

FIG. 3B illustrates an example of a graph structure of web pages. The web pages having such relationships may be subjected to PageRank, a known algorithm for rating web pages, which will be briefly explained below. The symbols i, j, k, and n represent integer variables, where i, j, and n are greater than or equal to one, and k is greater than or equal to zero. According to the simple sum formula of PageRank, the rank $r(P_i)$ of a page Pi is expressed as follows.

$$r(P_i) = \sum_{P_j \in B_{p_i}} \frac{r(P_j)}{|P_j|} \quad (1)$$

where $B_{p_i}$ represents a set of web pages having a link to a web page $P_i$ (i.e., backlinks of web page $P_i$), and $|P_j|$ represents the number of forward links in a web page $P_j$. As the rank $r(P_j)$ of every web page Pj is unknown, the ranking of web pages is determined by using an iterative method with an appropriate initial value of web pages (e.g., giving 1/n to each of the n web pages). More specifically, the following equation (2) gives the rank $r_{k+1}(P_i)$ of web page $P_i$ at the (k+1)th iteration cycle, and the computation is repeated until the rank of every web page converges.

$$r_{k+1}(P_i) = \sum_{P_j \in B_{p_i}} \frac{r_k(P_j)}{|P_j|} \quad (2)$$

where $r_0(P_i)=1/n$. Equation (2) determines the ranks page by page. The actual computation uses a matrix to repeat the same calculation, and the ranks of all web pages calculated at the (k+1)th iteration cycle are held in a row vector $\pi^T$ with a dimension of 1×n. Here the superscript T denotes transposition, indicating that $\pi^T$ is a row vector of n elements. The graph structure of web pages is expressed by an n×n matrix H, the rows being normalized individually. This matrix H is known as an adjacency matrix representing which nodes in a graph are adjacent to which other nodes. Specifically, element $H_{ij}$ of matrix H has a value of $1/|P_i|$ when there exists a link from web page $P_i$ to web page $P_j$, while the elements otherwise take the value of zero. The following equation (3) gives an example of matrix H.

$$H = \begin{matrix} & \begin{matrix} P_1 & P_2 & P_3 & P_4 & \ldots & P_n \end{matrix} \\ \begin{matrix} P_1 \\ P_2 \\ P_3 \\ P_4 \\ \vdots \\ P_n \end{matrix} & \begin{pmatrix} 0 & 1/2 & 1/2 & 0 & \ldots & 0 \\ 1/3 & 0 & 1/3 & 1/3 & \ldots & 0 \\ 0 & 1/2 & 0 & 1/2 & \ldots & 0 \\ 0 & 0 & 1 & 0 & \ldots & 0 \\ \vdots & \vdots & \vdots & \vdots & \ddots & \vdots \\ 0 & 0 & 0 & 0 & \ldots & 0 \end{pmatrix} \end{matrix} \quad (3)$$

Non-zero elements in the i-th row of matrix H correspond to web pages to which the forward links from web page $P_i$ are directed. Non-zero elements in the i-th column of matrix H correspond to web pages that originate backlinks of web page $P_i$. Vector $\pi^{(k+1)T}$ after the (k+1)th iteration cycle can be expressed as the following equation (4).

$$\pi^{(k+1)T} = \pi^{(k)T} H \quad (4)$$

The i-th element of vector $\pi^{(k+1)T}$ corresponds to rank $r_{k+1}(P_i)$. This equation (4), however, has some shortcomings relating to the convergence of vector $\pi^T$. For example, the algorithm has a problem called a "rank sink" which overrates web pages having no forward links. Matrix G, a modified version of matrix H, is therefore used to overcome the problem. That is, matrix H in equation (4) is replaced with matrix G. The computation of PageRank values now boils down to an eigenvector problem of matrix G since the eigenvector of matrix G corresponds to vector $\pi^T$. This eigenvector problem is expressed as follows:

$$\pi^T = \pi^T G \quad (5)$$

$$\pi^T e = 1 \quad (6)$$

where vector e is a column vector whose elements are all ones. Equation (6) normalizes the ranks so that the sum of the ranks of all web pages will be one. Computation of equation (5) may be performed by running, for example, a batch process that implements a power iteration method, and the elements of vector $\pi^T$ are normalized according to equation (6). In this way, the ranking of all web pages is determined with a desired accuracy. There are, however, so many web pages that it takes a long time to finish the noted batch process. For this reason, the above method is not suitable for incremental update of web page ranking.

In view of the above, the second embodiment is designed to provide approximate ranking of web pages, as opposed to the exact ranking obtained by using the PageRank algorithm. The following description uses the terms "rank" and "ranking" in a broader meaning, including such approximate ones.

Figure 4:
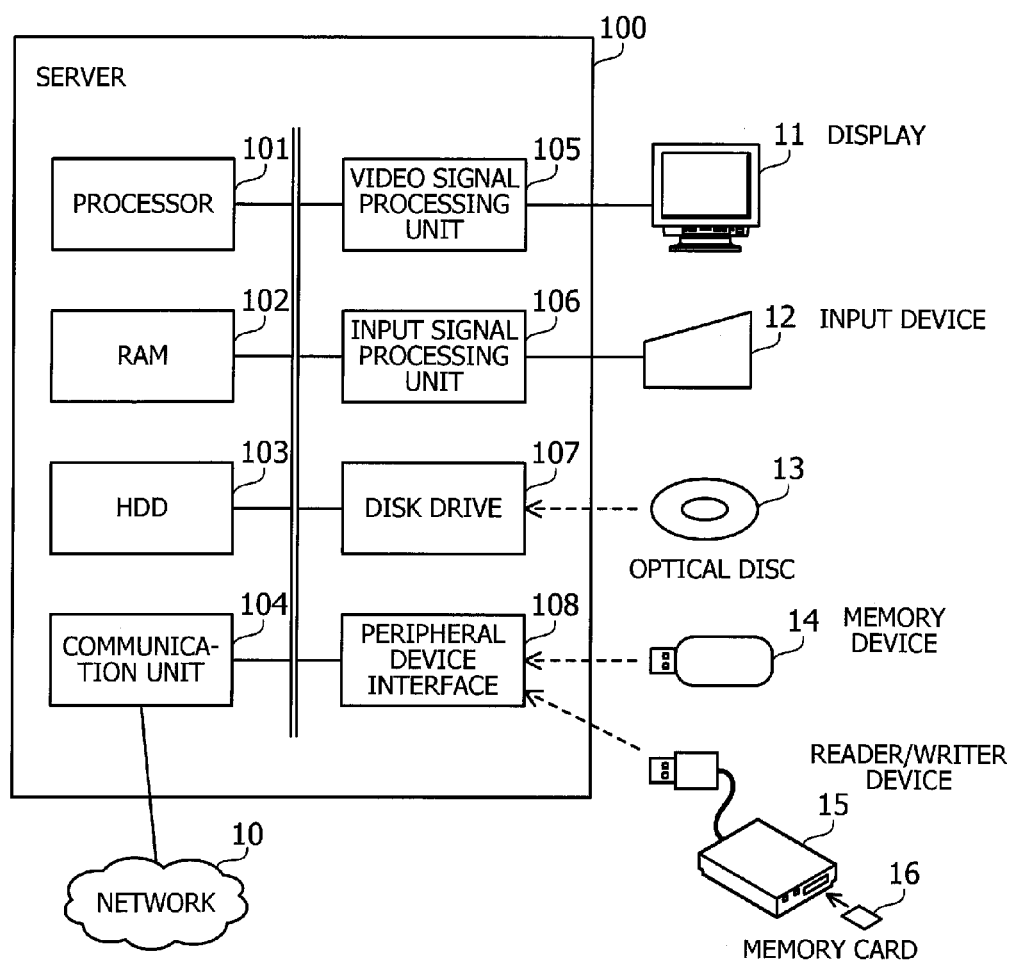
FIG. 4 illustrates an exemplary hardware configuration of a server according to the second embodiment.

FIG. 4 illustrates an exemplary hardware configuration of a server according to the second embodiment. The illustrated server 100 includes a processor 101, a RAM 102, a hard disk drive (HDD) 103, a communication unit 104, a video signal processing unit 105, an input signal processing unit 106, a disk drive 107, and a peripheral device interface 108. These components are connected together via a bus in the server 100. While FIG. 4 illustrates one server 100, the same hardware configuration may also be applied to the other server 100a, as well as to the clients 200 and 200a.

The processor 101 controls information processing operations in the server 100. This processor 101 may actually be a single processor or a system of multiple processors. For example, the processor 101 may be implemented with a micro processing unit (MPU), digital signal processor (DSP), application specific integrated circuit (ASIC), field-programmable gate array (FPGA), programmable logic device (PLD), or any combination of them.

The RAM 102 serves as primary storage of the server 100. Specifically, the RAM 102 is used to temporarily store at least some of the operating system (OS) programs and application programs that the processor 101 may execute, in addition to other various data objects that it manipulates at runtime.

The HDD 103 serves as secondary storage of the server 100. Specifically, the HDD 103 writes and reads data magnetically on its internal platters to store program and data files of the operating system and applications. The server 100 may include one or more HDDs and other kind of devices, such as flash memory devices and solid state drives (SSD), for the purpose of secondary storage.

The communication unit 104 is an interface for the processor 101 to communicate with other computers via a network 10. The communication unit 104 may be a wired network interface or a radio network interface.

The video signal processing unit 105 produces video images in accordance with commands from the processor 101 and outputs them on a display 11 coupled to the server 100. The display 11 may be, for example, a cathode ray tube (CRT) display or a liquid crystal display.

The input signal processing unit 106 receives input signals from input devices 12 attached to the server 100 and supplies these signals to the processor 101. The input devices 12 include, for example, a keyboard and a pointing device such as mouse and touchscreen.

The disk drive 107 is a device used to read program files and data files stored in an optical disc 13 by using laser light or the like. Optical discs 13 may include, for example, digital versatile disc (DVD), DVD-RAM, compact disc read-only memory (CD-ROM), CD recordable (CD-R), and CD rewritable (CD-RW). The disk drive 107 transfers programs and data read out of an optical disc 13 to, for example, the RAM 102 or HDD 103 according to commands from the processor 101.

The peripheral device interface 108 is a communication interface used to connect peripheral devices to the server 100. For example, a memory device 14 and a reader/writer device 15 may be connected to the peripheral device interface 108. The memory device 14 is a data storage medium with a capability of communicating with the peripheral device interface 108. The reader/writer device 15 is an adapter used to write data to or read data from a memory card 16, which is a data storage medium in the form of a small card. The peripheral device interface 108 transfers programs and data read out of the memory card 16 to the RAM 102 or HDD 103 according to commands from the processor 101.

Figure 5:
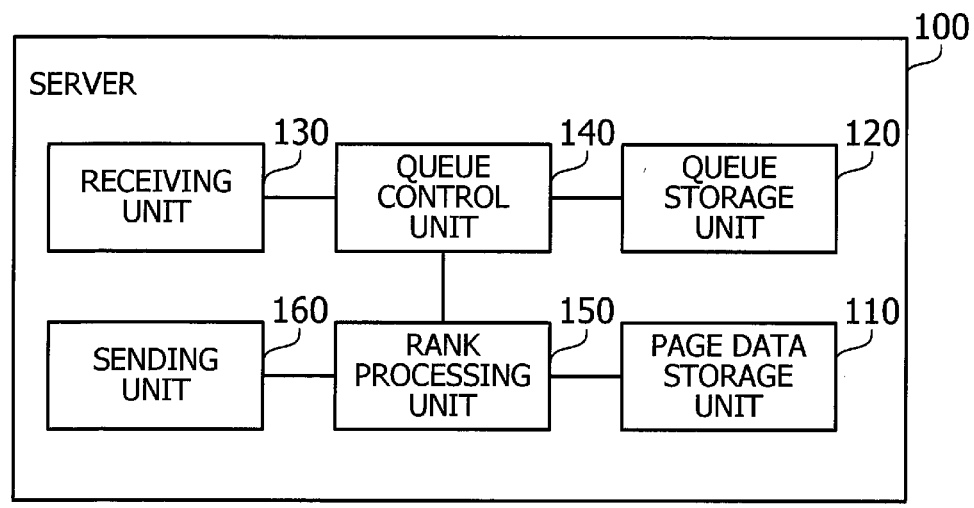
FIG. 5 illustrates an exemplary software configuration of a server according to the second embodiment.

FIG. 5 illustrates an exemplary software configuration of a server according to the second embodiment. The functional components illustrated in FIG. 5 are realized by, for example, causing the processor 101 to execute programs stored in the RAM 102. All or some of those components may also be implemented as ASIC, FPGA, or the like. This software configuration of the server 100 may similarly apply to the other server 100a.

The illustrated server 100 includes a page data storage unit 110, a queue storage unit 120, a receiving unit 130, a queue control unit 140, a rank processing unit 150, and a sending unit 160. The page data storage unit 110 stores information about web pages. The stored data indicate, for example, link relationships among web pages and the rank of each web page. The queue storage unit 120 provides a queue to store requests for updating the ranking of web pages, as well as requests for referencing the ranking of web pages. In the following description, the former requests are referred to as "update requests," and the latter requests "reference requests." The page data storage unit 110 and queue storage unit 120 may be implemented as part of storage space of the RAM 102 or HDD 103.

The receiving unit 130 receives update requests and reference requests from clients 200 and 200a and supplies them to the queue control unit 140. The queue control unit 140 manages the queue storage unit 120 to store jobs for the received update requests and reference requests. The queue control unit 140 retrieves update or reference jobs out of the queue storage unit 120 in the first-in first-out (FIFO) fashion and supplies the retrieved jobs to the rank processing unit 150. The queue control unit 140 may also store some additional information in the queue storage unit 120 to indicate details of each update or reference job produced by the rank processing unit 150.

The rank processing unit 150 evaluates the ranks of web pages, based on their data stored in the page data storage unit 110. Specifically, the rank processing unit 150 updates the ranks of web pages, based on an update request job supplied from the queue control unit 140. Unlike the batch processing mentioned previously, the rank processing unit 150 executes the update while searching the page data storage unit 110 to find out which web pages to update. When all update operations are finished, the rank processing unit 150 notifies the sending unit 160 of the completion.

The rank processing unit 150 also evaluates the rank of a referenced web page, based on a reference request job supplied from the queue control unit 140. The result of this evaluation is passed to the sending unit 160. More specifically, the rank processing unit 150 evaluates the rank of a web page specified in a given reference request, based on the ranks of other web pages that have links to that web page in question.

In addition to the above, the rank processing unit 150 may sometimes produce jobs during the course of its update or reference processing and send information about the produced jobs to the queue control unit 140.

The sending unit 160 sends a response to the client that has issued an update or reference request. For example, when a completion notice is received from the rank processing unit 150 as the response to an update request, the sending unit 160 forwards the notice to the requesting client (e.g., client 200). When a value of web page rank is received from the rank processing unit 150 as the response to a reference request, the sending unit 160 forwards the value to the requesting client.

FIG. 6 illustrates a web page management table according to the second embodiment. This web page management table 111 resides in the page data storage unit 110. Each table entry is formed from the following data fields: "URL," "Rank," "Forward Link," and "Backlink."

The URL field contains URL of a specific web page, and the rank field stores a value indicating the rank of that web page. The forward link field contains a list of URLs of other web pages linked from the web page of interest. The backlink field contains a list of URLs of other web pages having a link to the web page of interest.

For example, the illustrated web page management table 111 has an entry containing "P1" in the URL field, "0.01" in the rank field, "P2, P3" in the forward link field, and "P21, P22" in the backlink field. This entry means that a web page at URL "P1" has a rank of "0.01." It also indicates that the web page "P1" has forward links to two web pages at URLs "P2" and "P3" as well as backlinks from two web pages at URLs "P21" and "P22."

The rank processing unit 150 may be configured to keep the web page management table 111 up to date by re-determining the ranking of all web pages with the PageRank method at regular intervals (e.g., monthly). This regular update of web page ranks is expected to increase the reliability of evaluation according to the second embodiment.

As will be seen in the following description, web pages may be designated by their URLs. For example, the web page at URL "P1" is referred to as "web page P1."

Figure 7:
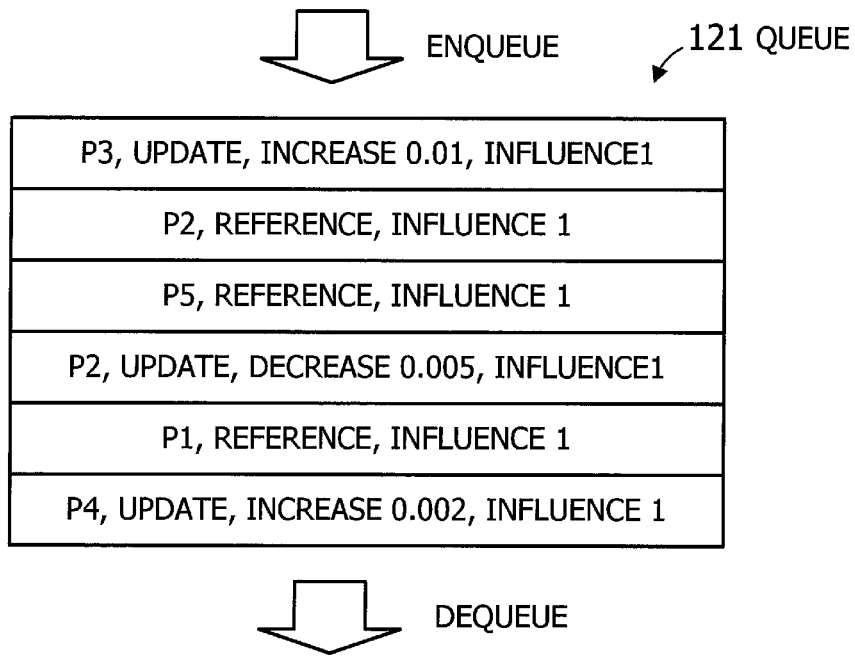
FIG. 7 illustrates a queue according to the second embodiment.

FIG. 7 illustrates a queue according to the second embodiment. This queue 121 is included in the queue storage unit 120 to contain a plurality of entries of job data in the following format: (Target web page URL, Job type, Job details, Influence).

The target web page URL field indicates the location of a web page to be updated or referenced. The job type field indicates whether the specified web page is to be updated or referenced. The job details field of an update job indicates how much increase or decrease is to take place in the rank. In the case of reference jobs, the job details field is not provided. The influence field of an update job gives a value representing how much influence the specified web page will have from changed ranking of the updated web page. The influence field of a reference job gives a value representing how much influence the specified web page will exert on the referenced web page. Some jobs in the queue 121 correspond to update requests and reference requests received from clients 200 and 200a. The influence field of those jobs is always set to one.

For example, the queue 121 in FIG. 7 contains an entry that specifies "P3, UPDATE, INCREASE 0.01, INFLUENCE 1." This queue entry indicates that an update request for web page P3 has been received, and that the requested update is to increase the rank by 0.01. The entry also indicates that the update has an influence of 100% on the web page P3 itself.

The queue 121 contains another entry that specifies "P2, REFERENCE, INFLUENCE 1." This entry indicates that a reference request for web page P2 has been received, and that the rank update of web page P2 is to have an influence of 100% on the web page P2 itself.

The queue 121 contains yet another entry that specifies "P2, UPDATE, DECREASE 0.005, INFLUENCE 1." This entry indicates that an update request for web page P2 has been received, and that the requested update is to decrease the rank by 0.005 and to have an influence of 100% on the web page P2 itself.

While not illustrated in FIG. 7, the job data in the queue 121 may further include information, such as Internet Protocol (IP) address, that indicates the requesting client. This information makes it possible to identify to which client a response is to be returned.

Each time a request arrives from clients 200 and 200a, the queue control unit 140 adds new job data into the queue 121 to register the request. Such job data is retrieved by the queue control unit 140 in the FIFO order and supplied to the rank processing unit 150. The rank processing unit 150 executes each received job.

The rank of a web page may increase in several cases as a result of a change in some other web pages. One case is when the number of forward links has decreased in an existing first web page that has a link to a second web page. The decrease of forward links permits the second web page to receive an increased share of the rank value from the first web page. Another case is when a first web page with a known rank is modified to add a forward link to a second web page. This forward link makes the second web page eligible to receive a share of the second web page's rank.

The rank of a web page may be reduced in several cases as a result of a change in some other web pages. One example is when the number of forward links has increased in an existing first web page that has a link to a second web page. In this case, the second web page receives a smaller share of the rank value from the first web page as a result of the increased forward links.

As can be seen from the above examples, addition or deletion of forward links in a web page may lead to an update of ranks in a plurality of other web pages.

Figure 8:
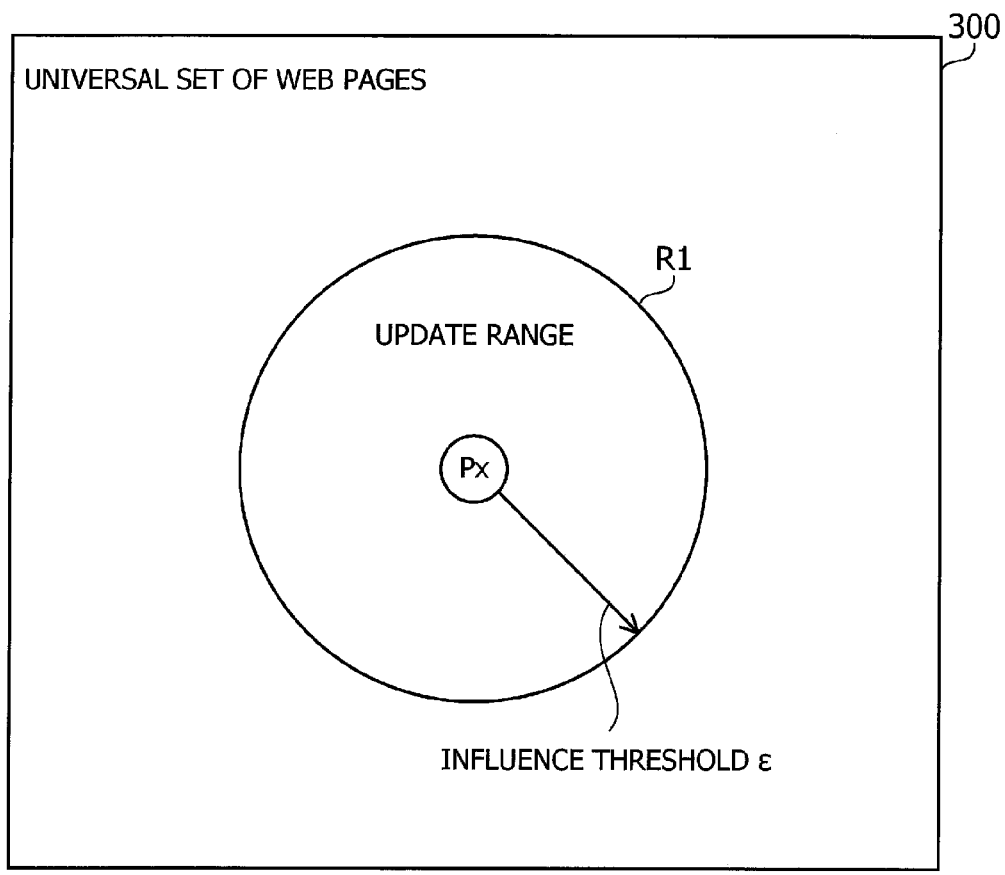
FIG. 8 illustrates an example of an update range according to the second embodiment.

FIG. 8 illustrates an example of an update range according to the second embodiment. Specifically, FIG. 8 illustrates an update range R1 within a universal set 300 of web pages. When there is an update request for the rank of web page Px, its effect will propagate over the update range R1. In other words, the web pages contained in this update range R1 are influenced by the update. Update-time influence $\delta$ is a real number in the range of $0<\delta \leq 1$, representing the degree of an influence on a web page at the time of updating. Specifically, this $\delta$ is defined as a ratio of $\Delta r'/\Delta r$ (on a percentage basis, where appropriate), where $\Delta r$ is a change in the rank of web page Px, and $\Delta r'$ is a change in the rank of each influenced web page. The term $\Delta r$ is a real number in the range of $-1<\Delta r<0$ or $0<\Delta r<1$. The term $\Delta r'$ is a real number in the range of $-1<\Delta r'<0$ or $0<\Delta r'<1$.

The update range R1 is determined by using an influence threshold $\epsilon$, which is a real number in the range of $0<\epsilon<1$. For example, the update range R1 of a particular web page Px is a set of other web pages whose update-time influence $\delta$ is greater than or equal to the influence threshold $\epsilon$. Here the influence threshold $\epsilon$ may be set to 0.05, or 5%, for example.

Figure 9:
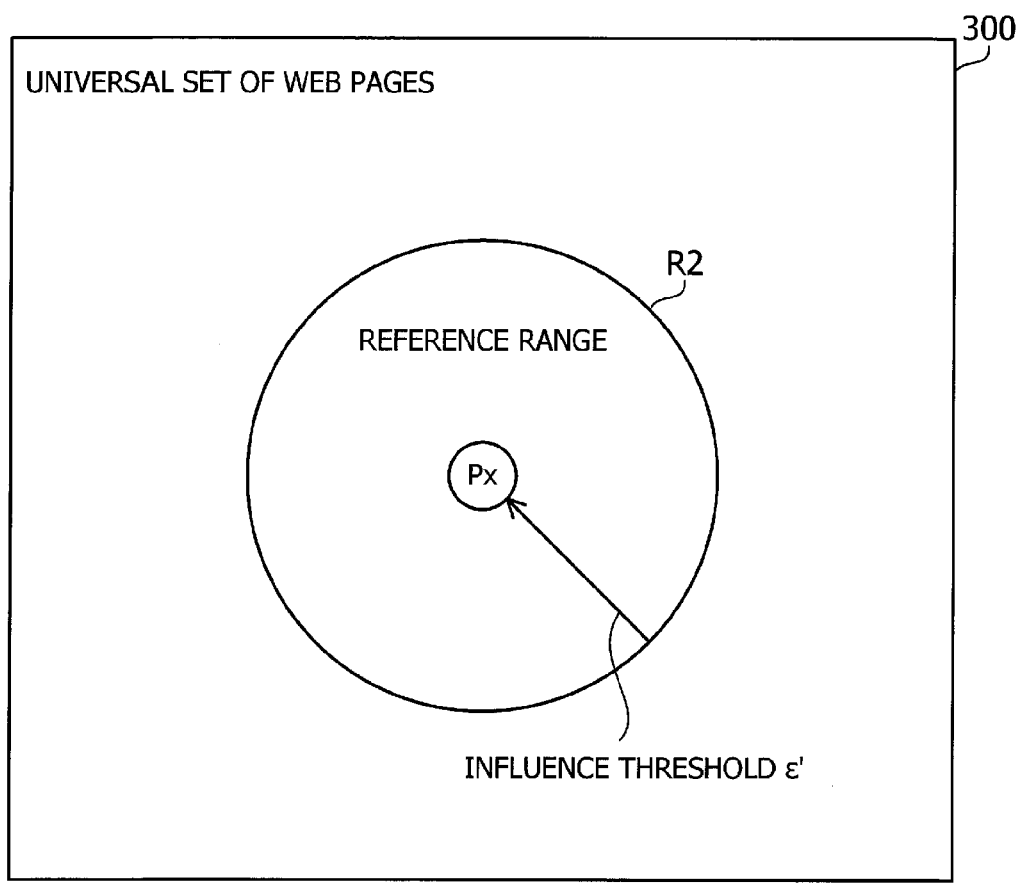
FIG. 9 illustrates an example of a reference range according to the second embodiment.

FIG. 9 illustrates an example of a reference range according to the second embodiment. Specifically, FIG. 9 illustrates a reference range R2 within a universal set 300 of web pages. When there is a reference request for the rank of web page Px, the requested rank is evaluated with reference also to other web pages in this reference range R2. Reference-time influence γ is a real number in the range of 0<γ≤1, representing the degree of influence on the rank that a web page Px receives from other web pages. This γ is defined as the ratio of how much part of the rank of a web page affects the rank of the influenced web page Px. Reference-time influence γ is calculated as a function of the number of forward links in a web page and the number of forward links lying between that web page and web page Px.

The reference range R2 is determined by using an influence threshold ε', which is a real number in the range of 0<ε'<1. For example, when a reference request is issued for the rank of web page Px, its reference range R2 is determined as a set of other web pages whose reference-time influence γ is greater than or equal to the influence threshold ε'. Here the influence threshold ε' may be set to 0.05, or 5%.

Figure 10:
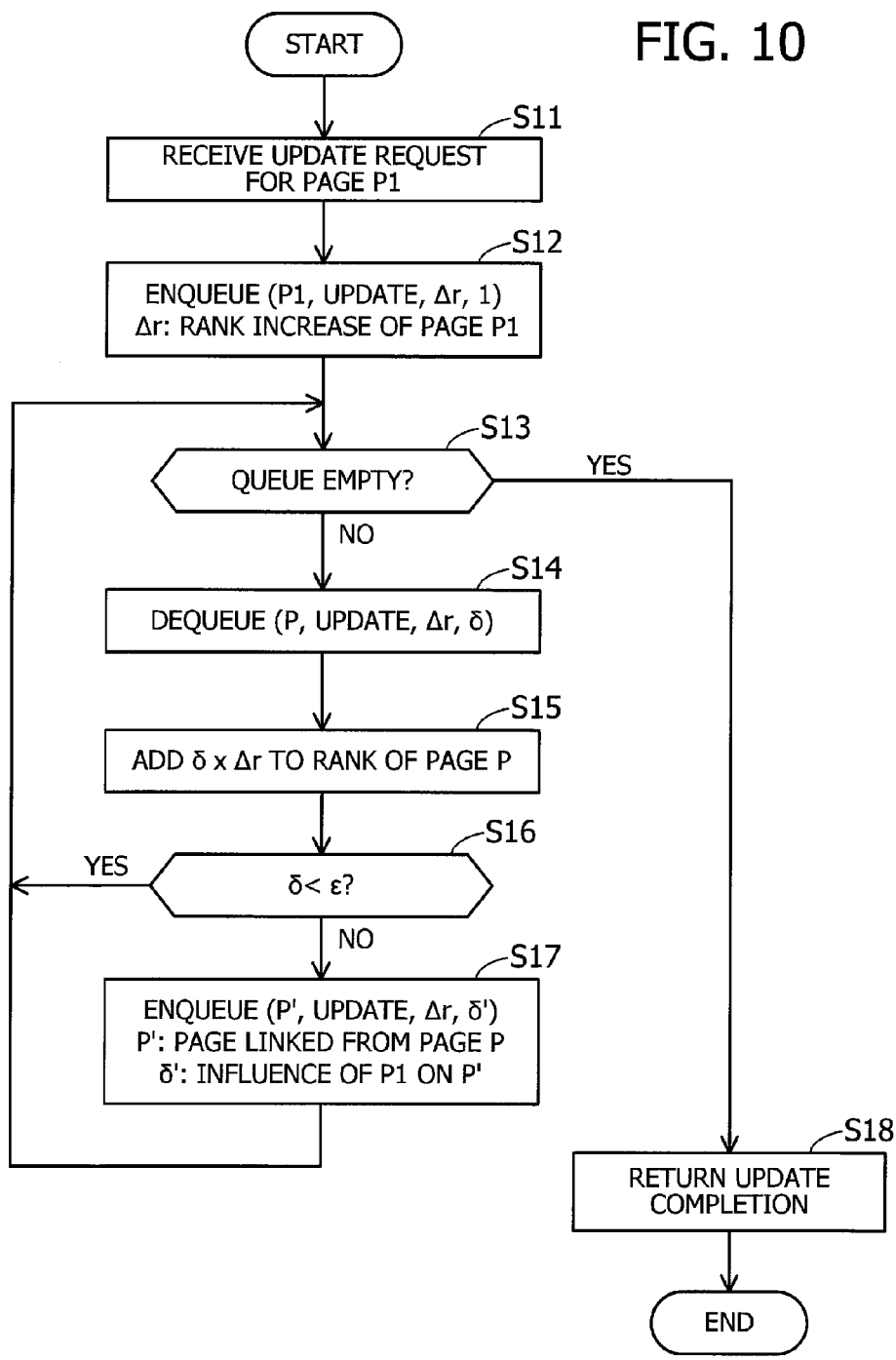
FIG. 10 is a flowchart illustrating a rank updating procedure according to the second embodiment.

FIG. 10 is a flowchart illustrating a rank updating procedure according to the second embodiment. Each operation in FIG. 10 is described below in the order of step numbers, assuming that the queue 121 contains no job data when the procedure starts with step S11.

(S11) The receiving unit 130 receives an update request from a client 200 and supplies it to the queue control unit 140. It is assumed that this update request is to increase the rank of web page P1 by Δr. As mentioned before, the update-time influence of this change of web page P1 on the web page P1 itself is Δr/Δr=1. Accordingly, the received update request is supplied to the queue control unit 140 as a job (P1, Update, Δr, 1).

(S12) The queue control unit 140 enqueues the supplied update request job (P1, Update, Δr, 1) into the queue 121.

(S13) The queue control unit 140 determines whether the queue 121 is empty. If the queue 121 is found to be empty, the queue control unit 140 so informs the rank processing unit 150, thus causing the procedure to branch to step S18. If the queue 121 is not empty, the procedure advances to step S14.

(S14) The queue control unit 140 dequeues an update job (P, Update, Δr, δ) from the queue 121 and supplies it to the rank processing unit 150. Dequeuing means removing an entry of job data from the queue 121.

(S15) With reference to the web page management table 111, the rank processing unit 150 adds δ×Δr to the rank of web page P.

(S16) The rank processing unit 150 determines whether δ is smaller than ε. If δ is smaller than ε, the procedure returns to step S13. If δ is greater than or equal to ε, the procedure advances to step S17.

(S17) The rank processing unit 150 produces an update job (P', Update, Δr, δ') and supplies it to the queue control unit 140. The queue control unit 140 enqueues the supplied job into the queue 121. Here the symbol P' represents a web page that is linked from web page P by its forward link. The rank processing unit 150 consults the web page management table 111 to find such a web page P'. The symbol δ' represents the influence of web page P1 on web page P'. More specifically, δ' is obtained by dividing δ by the number of forward links of web page P, where δ is the influence on web page P in the entry dequeued at step S14. When the web page P in question has links to a plurality of web pages, the rank processing unit 150 produces a plurality of jobs accordingly and enqueues them into the queue 121. The procedure then goes back to step S13.

When the web page P has no forward links, the procedure skips step S17 and returns directly to step S13.

(S18) The rank processing unit 150 produces and sends an update completion notice to the sending unit 160, which contains information (e.g., IP address) indicating the requesting client 200. The sending unit 160 forwards the update completion notice to the client 200 as a response to its request.

The server 100 thus updates the ranks of web pages while following their forward links until it finds an update-time influence smaller than a given influence threshold ε. The above-described procedure is based on the width-first search algorithm for traversing a graph. The number of steps taken in this search is O(N+M), where N is an integer greater than one which represents the number of web pages in the update range R1, and M is an integer greater than zero which represents the number of links in the same. This means that the computational cost of an update decreases as the update range R1 becomes smaller and increases as the update range R1 becomes greater. While the procedure seen in FIG. 10 handles an update request for web page P1, the same procedure may similarly apply to other web pages.

Figure 11:
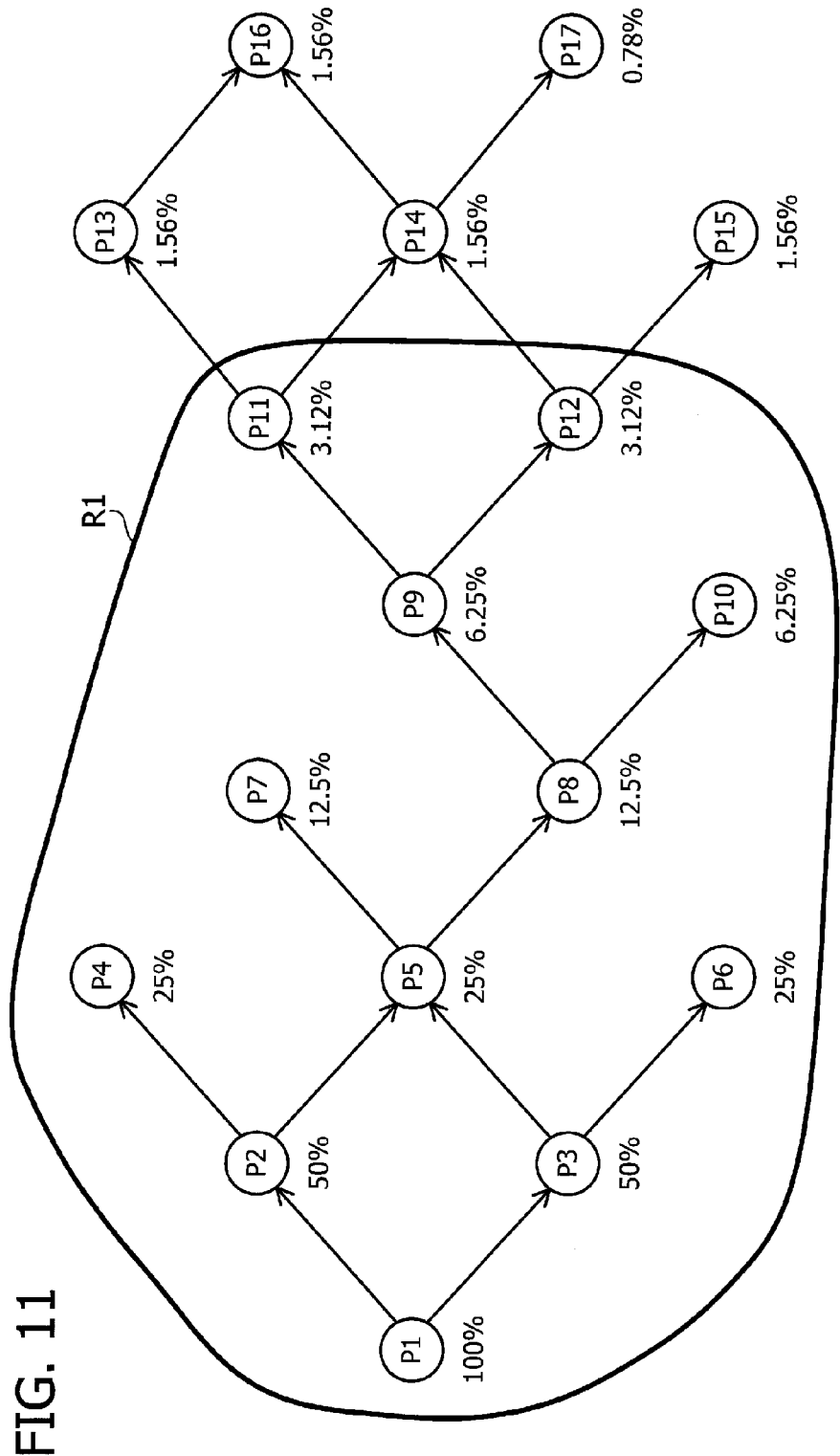
FIG. 11 illustrates an example of update-time influence according to the second embodiment.

FIG. 11 illustrates an example of update-time influence according to the second embodiment. Specifically, FIG. 11 assumes that the influence threshold ε is set to 5% for use at the time of updating web pages. The illustrated web pages P1 to P17 are part of the universal set 300 of web pages.

Web page P1 has forward links to web pages P2 and P3. Web page P2 has forward links to web pages P4 and P5. Web page P3 has forward links to web pages P5 and P6. Web page P5 has forward links to web pages P7 and P8. Web page P8 has forward links to web pages P9 and P10. Web page P9 has forward links to web pages P11 and P12. Web page P11 has forward links to web pages P13 and P14. Web page P12 has forward links to web pages P14 and P15. Web page P13 has a forward link to web page P16. Web page P14 has forward links to web pages P16 and P17.

According to the procedure discussed in FIG. 10, an update of the rank of web page P1 will affect other web pages with the following update-time influences. Web page P1 itself is influenced at 100%. Web pages P2 and P3 are influenced at 50%. That is, the influence is calculated as 100%÷2=50% because web page P1 has two forward links to web pages P2 and P3.

Web pages P4, P5, and P6 are each influenced at 25%. That is, the influence is calculated as 50%÷2=25% because each of their corresponding linking web pages P2 and P3 has two forward links.

Web pages P7 and P8 are each influenced at 12.5%. That is, the influence is calculated as 25%÷2=12.5% because their corresponding linking web page P5 has two forward links to web pages P7 and P8.

Web pages P9 and P10 are each influenced at 6.25%. That is, the influence is calculated as 12.5%÷2=6.25% because their corresponding linking web page P8 has two forward links to web pages P9 and P10.

Web pages P11 and P12 are each influenced at 3.12%. That is, the influence is calculated as 6.25%÷2=3.125% (rounded off to the second decimal place in FIG. 11) because their corresponding linking web page P9 has two forward links to web pages P11 and P12.

Web pages P13, P14, and P15 are each influenced at 1.56%. That is, the influence is calculated as 3.125%÷2=1.5625% (rounded off to the second decimal place in FIG. 11) because each of their corresponding linking web pages P11 and 12 has two forward links.

Web page P16 is influenced at 1.56%. That is, the 1.56% influence of web page P14 goes straight to the linked page P16 because its corresponding linking web page P14 has only one forward link. It is noted that web page P16 also receives a 0.78% influence from another linking web page P14 since the web page P14 has two forward links. For this reason, the influence on web page P16 may be evaluated as 1.56%+0.78%=2.34%.

Web page P17 is influenced at 0.78%. That is, the influence is calculated as 1.5625%÷2=0.78125% (rounded off to the second decimal place in FIG. 11) because its corresponding linking web page P14 has two forward links to web pages P16 and P17.

Here the rank processing unit 150 starts following the forward links from web page P1. In the illustrated case, it is web pages P11 and P12 where the rank processing unit 150 encounters an update-time influence below the influence threshold S in the first place. That is, web pages P1 to P12 belong to the update range R1 of web page P1. Accordingly, the rank processing unit 150 updates these web pages P2 to P12 during the course of following the forward links from web page P1. The remaining web pages P13 to P17 are, on the other hand, not updated by the rank processing unit 150.

Figure 12:
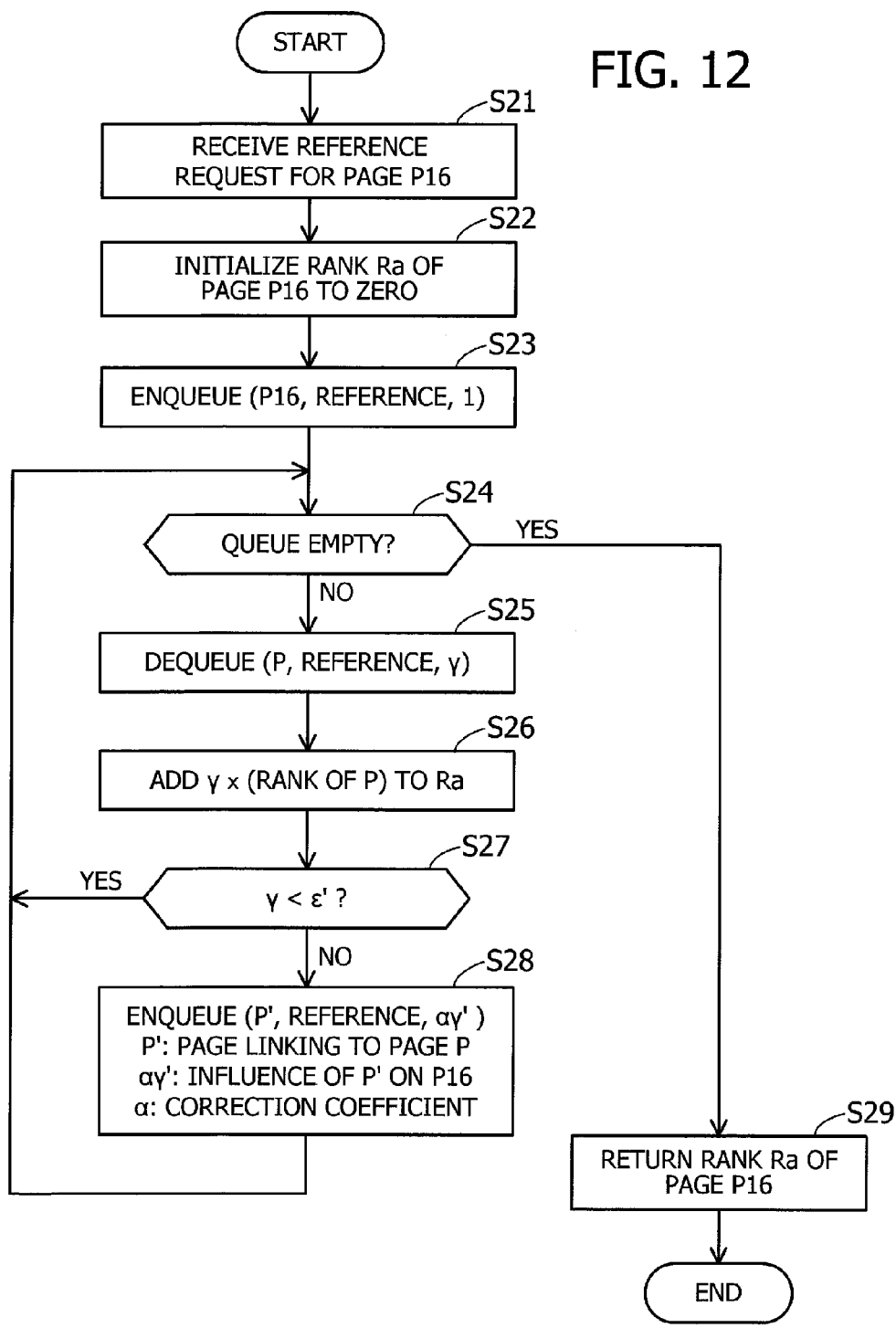
FIG. 12 is a flowchart illustrating a rank referencing procedure according to the second embodiment.

FIG. 12 is a flowchart illustrating a rank referencing procedure according to the second embodiment. Each operation in FIG. 12 is described below in the order of step numbers, assuming that the queue 121 contains no job data when the procedure starts with step S21.

(S21) The receiving unit 130 receives a reference request from a client 200 and supplies it to the queue control unit 140. It is assumed here that the reference request specifies web page P16. As mentioned before, the reference-time influence of web page P16 on the web page P16 itself is one. Accordingly, the received reference request is supplied to the queue control unit 140 as a job (P16, Reference, 1).

(S22) The queue control unit 140 informs the rank processing unit 150 that a reference request for web page P16 has been accepted. In response, the rank processing unit 150 initializes the rank Ra of web page P16 to zero.

(S23) The queue control unit 140 enqueues the supplied reference request job (P16, Reference, 1) into the queue 121.

(S24) The queue control unit 140 determines whether the queue 121 is empty. If the queue 121 is found to be empty, the queue control unit 140 so informs the rank processing unit 150, thus causing the procedure to proceed to step S29. If the queue 121 is not empty, the procedure advances to step S25.

(S25) The queue control unit 140 dequeues a reference job (P, Reference, Δr, γ) from the queue 121 and supplies it to the rank processing unit 150. Dequeuing means removing an entry of job data from the queue 121.

(S26) With reference to the web page management table 111, the rank processing unit 150 obtains the rank of web page P. The rank takes a value of zero when web page P is web page P16 itself. The rank processing unit 150 adds γ times the obtained rank of web page P to the rank Ra of web page P16.

(S27) The rank processing unit 150 determines whether γ is smaller than ε'. If γ is smaller than ε', the procedure returns to step S24. If γ is greater than or equal to ε', the procedure advances to step S28.

(S28) The rank processing unit 150 produces a reference job (P', Reference, αγ') and supplies it to the queue control unit 140. The queue control unit 140 enqueues the supplied job into the queue 121. Here the symbol P' represents a web page from which the web page P has a backlink. The rank processing unit 150 consults the web page management table 111 to find such a web page P'. The term αγ' represents the influence of web page P' on web page P16, where γ' is obtained by dividing γ by the number of forward links in web page P'. The symbol α is a real number in the range of 0<α<1 which represents a correction coefficient, where γ is the influence γ of web page P in the entry dequeued at step S25. When the web page P in question is linked from a plurality of web pages, the rank processing unit 150 produces a plurality of jobs and enqueues them into the queue 121. The procedure then goes back to step S24. When the web page P has no backlinks, the procedure skips step S28 and returns directly to step S24.

(S29) The rank processing unit 150 supplies the sending unit 160 with the obtained rank Ra of web page P16, which contains information (e.g., IP address) indicating the requesting client 200. The sending unit 160 forwards the obtained rank Ra of web page P16 to the client 200 as a response to its request.

The rank processing unit 150 follows the backlinks from web page P16 until it reaches a web page whose reference-time influence is smaller than the influence threshold ε'. During this course, the rank processing unit 150 evaluates the rank of web page P16 in question by adding a product of the rank and reference-time influence of each intervening web page. The above-described procedure is based on the width-first search algorithm for traversing a graph. The number of steps taken in this search is O(N+M), where N is an integer greater than one which represents the number of web pages in the reference range R2, and M is an integer greater than zero which represents the number of links in the same. This means that the computational cost of reference operations decreases as the reference range R2 becomes smaller and increases as the reference range R2 becomes greater. While the process seen in FIG. 12 assumes a reference request for web page P16, the same procedure may similarly apply to other web pages.

Figure 13:
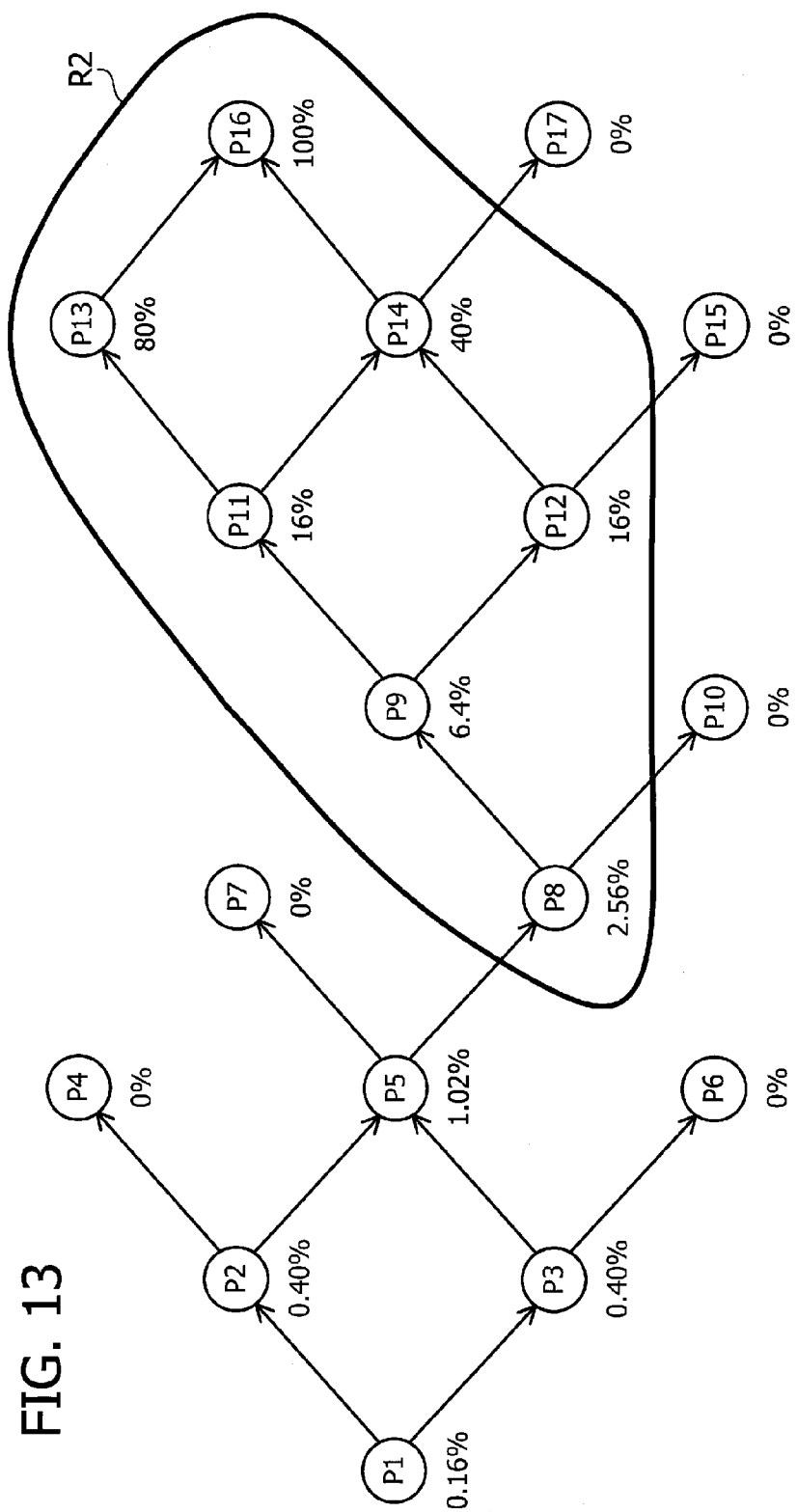
FIG. 13 illustrates an example of reference-time influence according to the second embodiment.

FIG. 13 illustrates an example of reference-time influence according to the second embodiment, assuming that the influence threshold ε' for reference is set to 5%, and the correction coefficient α is set to 80%. The illustrated structure of web pages P1 to P17 is identical to the one in FIG. 11.

According to the procedure discussed in FIG. 12, the referencing of the rank of web page P16 will be affected by the following reference-time influences from other web pages. First, web page P16 influences itself at 100%. Web page P13 then gives an influence of 80%. That is, the influence is calculated as 100%÷1×0.8=80% because web page P13 has one forward link to web page P16.

Web page P14 gives an influence of 40%. That is, the influence is calculated as 100%÷2×0.8=40% because web page P14 has two forward links to web pages P16 and P17.

Web pages P11 and P12 give an influence of 16%. That is, the influence is calculated as 40%÷2×0.8=16% because each of these web pages P11 and P12 has two forward links.

Web page P9 gives an influence of 6.4%. That is, the influence is calculated as 16%÷2×0.8=6.4% because web page P9 has two forward links to web pages P11 and P12.

Web page P8 gives an influence of 2.56%. That is, the influence is calculated as 6.4%÷2×0.8=2.56% because web page P8 has two forward links to web pages P9 and P10.

Web page P5 gives an influence of 1.02%. That is, the influence is calculated as 2.56%÷2×0.8=1.024% (rounded off to the second decimal place in FIG. 13) because web page P5 has two forward links to web pages P7 and P8.

Web pages P2 and P3 give an influence of 0.40%. That is, the influence is calculated as 1.024%÷2×0.8=0.4096% (rounded off to the second decimal place in FIG. 13) because each of these web pages P2 and P3 has two forward links.

Web page P1 gives an influence of 0.16%. That is, the influence is calculated as 0.4096%÷2×0.8=0.16384% (rounded off to the second decimal place in FIG. 13) because web page P1 has two forward links to web pages P2 and P3.

The other web pages P4, P6, P7, P10, P15, and P17 have no forward links to the web page P16 in question. Accordingly, their influence on web page P16 is 0%.

Here the rank processing unit 150 starts following the backlinks from web page P16. In the illustrated case, it is web page P8 where the rank processing unit 150 encounters a reference-time influence below the influence threshold $\epsilon'$ in the first place. That is, web pages P8, P9, P11, P12, P14, and P16 belong to the reference range R2 of web page P16. Accordingly, the rank processing unit 150 calculates the rank of web page P16 from those of web pages P14, P13, P12, P11, P9, and P8, during the course of following the backlinks from web page P16.

The above-described second embodiment enhances the reliability of web page ranks besides reducing the computational costs for updating the ranks. Specifically, the reduction of computational costs is achieved by setting a limited update range R1 of web pages. This means in turn that restrictions on the propagation of influence of updates could spoil the accuracy in ranking web pages that reside outside the update range R1 (e.g., web pages P13 to P17 in FIG. 11). While a web page's own rank may simply be returned in response to a reference request, that rank value might not always be reliable because of the above reasons.

In view of the above, the proposed servers 100 and 100a are designed to determine the rank of a web page, when it is referenced, by taking into consideration the ranks of other web pages in a reference range R2. In the example discussed above for web page P16, the rank of web page P16 in question is evaluated on the basis of ranks of a certain group of web pages that are supposed to affect the rank of the web page P16. The resulting rank of web page P16 could include a reflection of, for example, a past update made to web page P1, indirectly via some influenced web page(s) in the reference range R2, even if the update did not reach the web page P16 per se. With this feature, the servers provide more reliable ranking of web page P16 at the time of referencing. The error of referenced rank values is expected to be about $\epsilon\epsilon'$ with respect to the exact values calculated on the basis of equations (5) and (6), where $\epsilon$ and $\epsilon'$ are influence thresholds for updating and referencing. The error caused by a restricted range of rank distribution is about $\epsilon$ (influence threshold for updating). Since $\epsilon'$ is in the range of $0<\epsilon'<1$, the following inequality holds: $\epsilon\epsilon'<\epsilon$. That is, the proposed technique reduces possible errors in the rank of a referenced web page due to restricted rank propagation, thus improving the reliability of rank evaluation.

The above-described method works effectively when, for example, an update of a web page has to be reflected in other web pages as quickly as possible. In the case where the web page is updated relatively often, the update-time influence threshold $\epsilon$ may be set to be higher than the reference-time influence threshold $\epsilon'$, thus narrowing the update range R1. This setup alleviates computational costs of web page updating and thus makes it possible to update the ranking of web pages by keeping track of their frequent changes. The influence threshold $\epsilon'$ smaller than $\epsilon$ means in this case that the reference range R2 is expanded. That is, the influence of other web pages may be varied in such a way that the product $\epsilon\epsilon'$ of the update-time influence threshold and reference-time influence threshold will be constant, thereby maintaining possible errors of the referenced rank substantially at a constant level in spite of changes in other web pages. In the case where a web page is referenced more often than it is updated, the reference-time influence threshold $\epsilon'$ may be given a larger value than the update-time influence threshold $\epsilon$.

(c) Third Embodiment

This section describes a third embodiment. The following description of the third embodiment focuses on its difference from the foregoing second embodiment. See the previous sections for their common elements and features.

The third embodiment provides a function of dynamically varying the influence thresholds $\epsilon$ and $\epsilon'$, depending on the frequency of update requests and reference requests. The configuration of an information processing system according to the third embodiment is similar to the one discussed in FIG. 2 for the second embodiment. Also the hardware configuration and software configuration of the third embodiment are similar to those of the server 100 discussed in FIGS. 4 and 5 for the second embodiment. The following description of the third embodiment will use the same names and reference numerals to refer to its constituent devices and components as those used in the second embodiment.

The third embodiment is different from the second embodiment in a few points. One difference is that the page data storage unit 110 further stores a log table to record what updates were made to the ranking of web pages on the outward bounds of an update range R1 of a specific web page. Another difference is that the rank processing unit 150 is configured to vary influence thresholds $\epsilon$ and $\epsilon'$, depending on the frequency of update requests and reference requests during a predetermined period (e.g., one day or one week) in the past.

Figure 14:
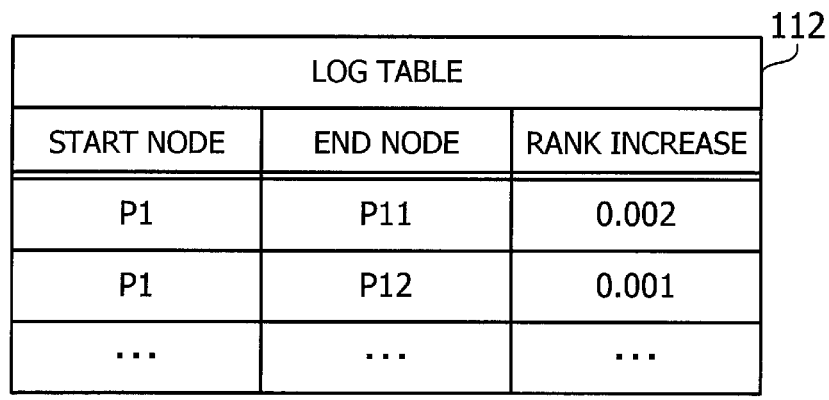
FIG. 14 illustrates an example of a log table according to a third embodiment.

FIG. 14 illustrates an example of a log table according to the third embodiment. This log table 112 resides in the page data storage unit 110 and its entries are formed from the following data fields: "Start Node," "End Node," and "Rank Increase."

The start node field contains a URL that indicates a web page specified in an update request, and the end node field contains a URL that indicates another web page at which the resulting update procedure was terminated. The latter web page is one of the web pages on the outward bounds of the update range R1. The rank increase field contains a value representing how much the rank was increased by the update. When the value is negative, it means that the rank was decreased.

For example, the illustrated log table 112 has an entry containing "P1" in the start node field, "P11" in the end node field, and "0.002" in the rank increase field. This entry means that an update request was received for the rank of web page P1, and the update was terminated at web page P11 with an increase of "0.002" in the rank.

The log table 112 may include a plurality of entries having the same start node and different end nodes. The illustrated log table 112 of FIG. 14 contains two entries having the same start node P1 and two different end nodes P11 and P12.

The rank processing unit 150 executes the foregoing procedure of FIG. 10. At step S18 in that procedure, the rank processing unit 150 enters records of update results in the log table 112. Referring to the example of FIG. 11, the update starts from web page P1 (start node) and terminates at web pages P11 and P12 (end nodes) in the update range R1. The rank processing unit 150 thus records these end nodes P11 and P12 in the log table 112, together with the information of the start node P1.

Figure 15:
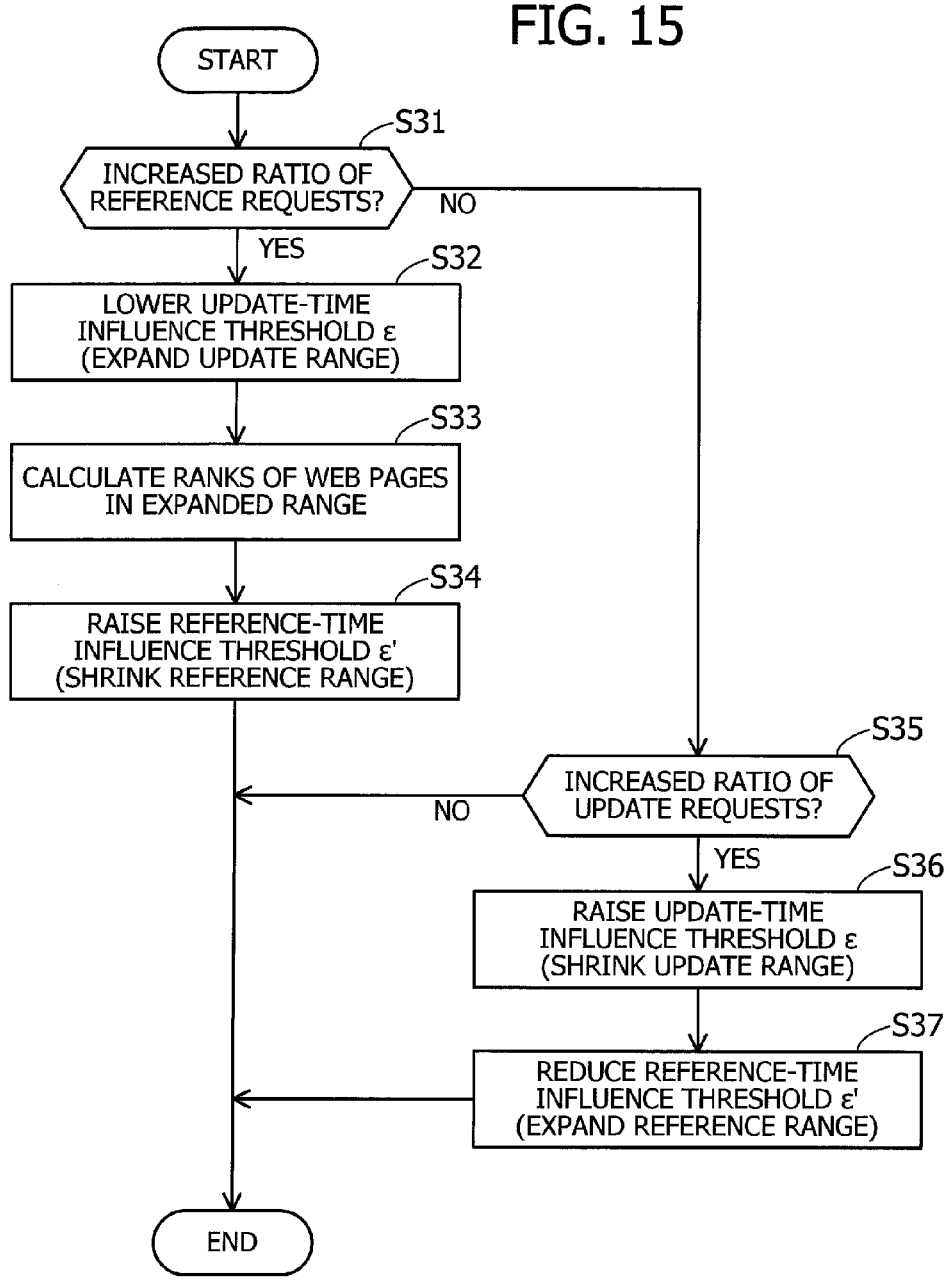
FIG. 15 is a flowchart illustrating changes in update and reference ranges according to the third embodiment.

FIG. 15 is a flowchart illustrating changes in update and reference ranges according to the third embodiment. Each operation in FIG. 15 is described below in the order of step numbers.

(S31) The rank processing unit 150 checks the ratio between incoming update requests and reference requests from clients 200 and 200a, in terms of their frequency during a predetermined period (e.g., one day) in the past. Specifically, the rank processing unit 150 determines whether the share of reference requests has grown above a given default ratio. If so, the procedure advances to step S32. If not, then the procedure proceeds to step S35. The rank processing unit 150 has previously been given a default ratio of, for example, 1:2 in terms of the frequency of update requests versus frequency of reference requests. This default ratio is also used as the basis for determining default values of influence thresholds $\epsilon$ and $\epsilon'$. For example, $\epsilon = 5\%$ and $\epsilon' = 10\%$ when the default ratio is 1:2.

(S32) The rank processing unit 150 lowers the update-time influence threshold $\epsilon$. Suppose, for example, that the current ratio of update requests versus reference requests is 1:4. This means that the frequency of reference requests has grown two-fold, compared with the above-noted default ratio. The rank processing unit 150 then reduces $\epsilon$ to the half as follows: $\epsilon = 5\% \div 2 = 2.5\%$. This reduction results in an expanded update range R1. As will be described below, $\epsilon'$ is doubled in this case to maintain possible errors on the same order, besides reducing the computational cost of referencing ranks.

(S33) Based on the log table 112, the rank processing unit 150 updates the rank of each web page in a range corresponding to the difference between the expanded update range and the original update range. The details will be described later.

(S34) The rank processing unit 150 raises the reference-time influence threshold $\epsilon'$. Referring again to the example discussed at step S32, the rank processing unit 150 doubles $\epsilon'$ as follows: $\epsilon' = 10\% \times 2 = 20\%$. This results in a shrunken reference range R2. The rank processing unit 150 then exits from the present procedure.

(S35) The rank processing unit 150 determines whether the ratio of update requests has grown above a given default ratio. If so, then the procedure advances to step S36. If not, then the rank processing unit 150 exits from the present procedure.

(S36) The rank processing unit 150 raises the update-time influence threshold $\epsilon$. Suppose, for example, that the current ratio of update requests versus reference requests is 2:2. This means that the frequency of update requests has grown two-fold, compared with the above-noted default ratio. The rank processing unit 150 then doubles the update-time influence threshold $\epsilon$ as follows: $\epsilon = 5\% \times 2 = 10\%$. This produces a shrunken update range R1 to reduce computational costs.

(S37) The rank processing unit 150 reduces the reference-time influence threshold $\epsilon'$. Referring again to the example discussed at step S36, the rank processing unit 150 reduces $\epsilon'$ to the half as follows: $\epsilon' = 10\% \div 2 = 5\%$. This reduction of $\epsilon'$ results in an expanded reference range R2, thus balancing the raised $\epsilon$ to maintain possible errors on the same order. The rank processing unit 150 then exits from the present procedure.

The above procedure permits the rank processing unit 150 to check and adjust the influence thresholds $\epsilon$ and $\epsilon'$ regularly. The update range R1 and reference range R2 are varied with the frequency of update requests and reference requests, thus making it possible to effectively reduce computational costs depending on the inflow of the requests. Particularly, the update-time influence threshold $\epsilon$ and reference-time influence threshold $\epsilon'$ are adjusted, as illustrated above, in such a way that their product $\epsilon\epsilon'$ will be constant. This control maintains possible errors of the referenced rank substantially at a constant level in spite of changes in other web pages.

It is noted that the procedure of FIG. 15 may be modified such that the rank processing unit 150 executes step S34, skipping step S33. In this case, step S33 is executed in parallel with the routine of handling update and reference requests.

Figure 16A:
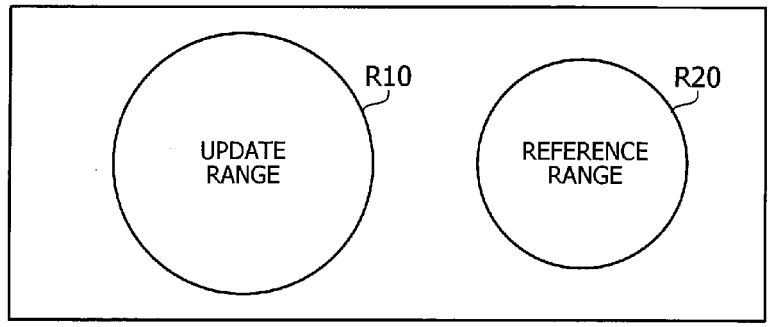
FIGS. 16A, 16B, and 16C illustrate a first example of changing update and reference ranges according to the third embodiment.
Figure 16B:
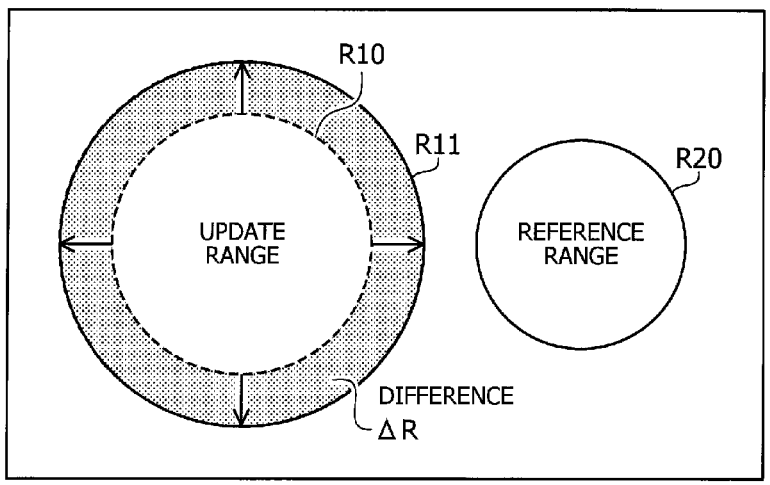
Figure 16C:
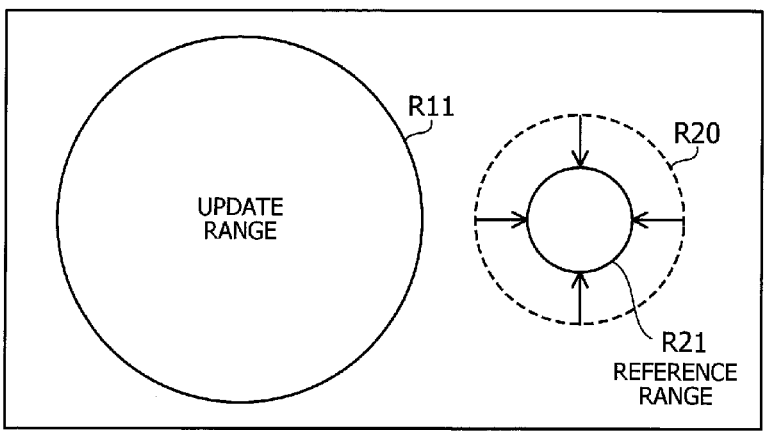

FIGS. 16A, 16B, and 16C illustrate a first example of changing update and reference ranges according to the third embodiment. Specifically, FIGS. 16A, 16B, 16C represent the case where the update range is expanded while the reference range is shrunken, as in steps S32 to S34 of FIG. 15.

FIG. 16A illustrates an update range R10 and a reference range R20 before influence thresholds are changed. The update-time influence threshold $\epsilon$ for the illustrated update range R10 is, for example, 5%. The reference-time influence threshold $\epsilon'$ for the illustrated reference range R20 is, for example, 10%.

FIG. 16B illustrates a new state of the ranges when $\epsilon$ in FIG. 16A is reduced to, for example, 2.5%. The original update range R10 is expanded to a new update range R11, producing a difference region $\Delta R$ between them.

The rank processing unit 150 then updates web pages that belong to this difference region $\Delta R$, based on the log table 112, to enhance the accuracy of reference-time evaluation of the ranks.

More specifically, the rank processing unit 150 picks up a start node and its corresponding end node from a record in the log table 112 and causes the effect of the start node to propagate up to the destinations of forward links in the end node. The range of this propagation (update range R11) is determined by the tree of forward links originating from the start node and the new influence threshold C. Here the record in the log table 112 indicates how much the rank of the end node was increased. Accordingly, the rank processing unit 150 has only to begin with the nodes pointed by forward links of the end node, using the recorded rank increase for propagation. That is, there is no need to re-calculate the ranks of web pages within the update range R10.

FIG. 16C illustrates how the ranges change when $\epsilon'$ of FIG. 16B is reduced to, for example, 20%. The original reference range R20 is shrunken to a smaller reference range R21, thus reducing computational costs at the time of referencing. The update range R10, on the other hand, is expanded to a larger update range R11 to maintain the accuracy of the referenced rank at substantially the same level as in FIG. 16A.

Figure 17A:
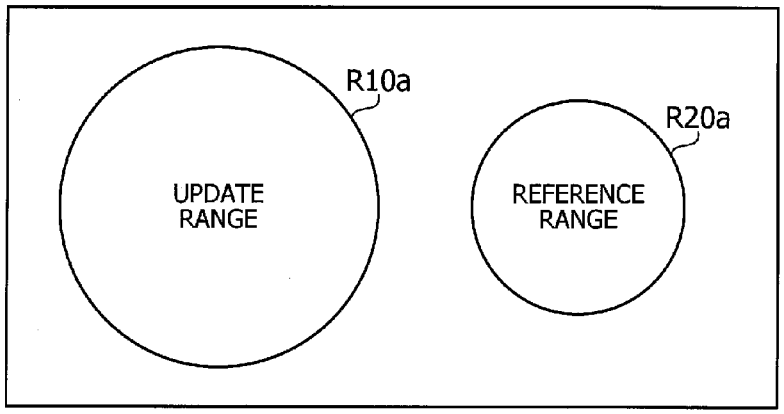
FIGS. 17A, 17B, and 17C illustrate a second example of changing update and reference ranges according to the third embodiment.
Figure 17B:
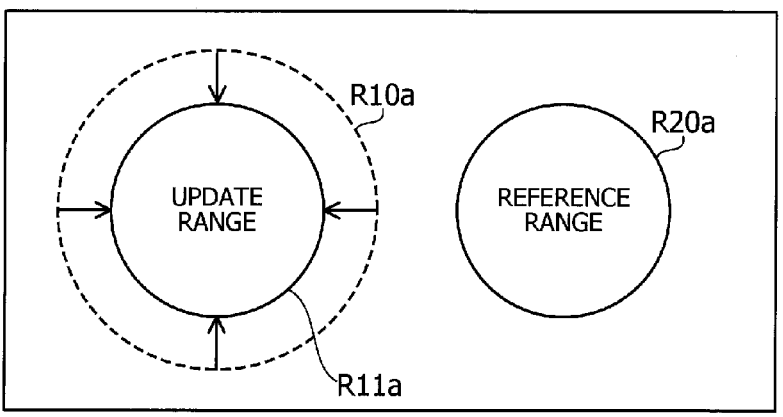
Figure 17C:
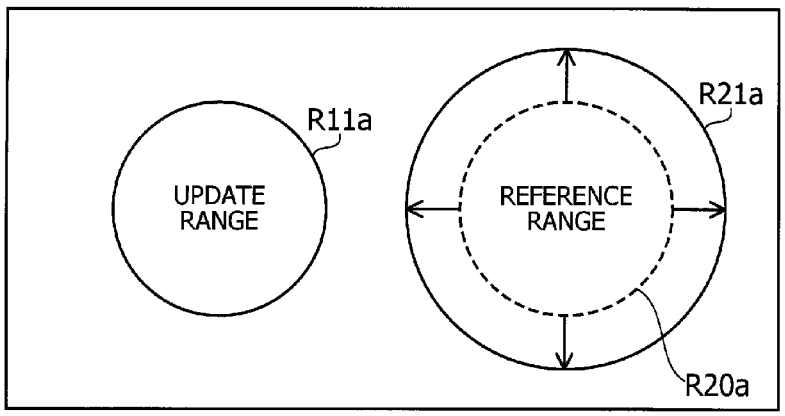

FIGS. 17A, 17B, and 17C illustrate a second example of changing update and reference ranges according to the third embodiment. Specifically, FIGS. 17A, 17B, and 17C represent the case where the update range is shrunken while the reference range is expanded, as in steps S36 and S37 of FIG. 15.

FIG. 17A illustrates an update range R10a and a reference range R20a before the influence thresholds are changed. The update-time influence threshold C for the illustrated update range R10a is, for example, 5%. The reference-time influence threshold $\epsilon'$ for the illustrated reference range R20a is, for example, 10%.

FIG. 17B illustrates a new state of the ranges when $\epsilon$ in FIG. 17A is raised to, for example, 10%. The original update range R10a is shrunken to a smaller update range R11a.

FIG. 17C illustrates another new state of the ranges when $\epsilon'$ in FIG. 17B is reduced to, for example, 5%. The original reference range R20a is expanded to a larger reference range R21a.

As can be seen from the above, narrowing the original update range R10a to a smaller update range R11a results in a reduce computational cost at the time of updating. The reference range R20a, on the other hand, is expanded to a larger reference range R21a to maintain the accuracy of the referenced rank at substantially the same level as in FIG. 17A.

As can be seen from the above examples, the third embodiment is designed to vary the update and reference ranges of web page ranking as the frequency of update requests and reference requests changes. More specifically, the rank processing unit 150 narrows (shrinks) the update range when update requests arrive more frequently than their default level, thereby reducing computational costs of increased update requests. When, on the other hand, reference requests arrive more frequently than their default level, the rank processing unit 150 narrows (shrinks) the reference range. This feature enables quicker response to reference requests for the ranks, besides alleviating their computational cost.

Also, the rank processing unit 150 is configured to expand the reference range when it shrinks the update range, and to expand the update range when it shrinks the reference range. This feature prevents the referenced rank values from degradation of reliability.

While the second and third embodiments have been discussed in the context of web page ranking, their concept may also be used in other applications such as rating of scholarly papers. A scholarly paper often cites other papers. Such citation may be modeled as a directed graph that contains, for example, first and second nodes 21 and 22 representing first and second papers (e.g., document data) and a unidirectional arrow (link) 23 representing citation of the second paper by the first paper. This directed graph can be used to evaluate the rating of importance of papers. The same technique may similarly be applied to evaluation of patent documents since they often quote other patents as the background art.

The proposed techniques may further be applied to evaluation of non-document objects. One such application is a system for proposing recommended products to customers of online shopping. For example, a directed graph includes first and second nodes 21 and 22 representing first and second products that a particular customer purchased in the past. A unidirectional arrow (link) 23 is drawn from the first node to the second node to indicate that, when a customer buys the first product, the same customer may also buy the second product. The system may thus produce a piece of data that includes first product information, together with a link to second product information. A collection of such data is used to evaluate each product in terms of the degree of recommendation.

As noted previously, the data processing operations of the first embodiment is realized by causing an information processing apparatus 1 to execute a particular program. Similarly, the data processing operations of the second embodiment is realized by causing servers 100 and 100a to execute a particular program. Such programs may be encoded in computer-readable storage media (e.g., optical disc 13, memory device 14, memory card 16).

Portable storage media may be used for distribution of programs. Network-based distribution of programs may also be possible, in which case program files are made available in a remote computer for downloading to other computers via a network. A computer executes programs read out of its local storage device, which have been previously installed from a portable storage medium or downloaded from the remote computer. Alternatively, the computer may execute programs read out of a portable storage medium or downloaded from the remote computer, without installing them in its local storage device.

It is further noted that all or some of the foregoing information processing operations may be implemented with DSP, ASIC, PLD, or other electronic circuit, or combinations of the same.

Several embodiments and their variations have been discussed above. According to one aspect of those embodiments, the proposed techniques enhance the reliability of evaluation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An evaluation method for determining an evaluation score of one data object based on evaluation scores of and links in related data objects, the links each permitting one data object to point to another data object, the evaluation method comprising:
    updating, by a processor and in response to an update made to a first data object, the evaluation scores of one or more second data objects linked from at least the first data object and the evaluation scores of data objects which are linked from the first data object via the second data objects, based on the evaluation score of the first data object; and
    determining, by the processor and in response to a reference request for one data object, the evaluation score of the requested data object, based on the evaluation scores of one or more third data objects having a link to the requested data object and the evaluation scores of data objects which link to the requested data object via the third data objects;
    wherein the updating includes selecting data objects, whose evaluation scores are to be updated, based on a ratio of a change in evaluation score of other data objects against a change in evaluation score of the first data object; and
    the determining includes selecting data objects, whose evaluation scores are to be used to determine the evaluation score of the requested data object, based on a ratio of how much part of evaluation scores of other data objects affects the evaluation score of the requested data object.

2. The evaluation method according to claim 1, further comprising:
    updating, by the processor and subsequent to the updating of the evaluation score of the first data object, the evaluation scores of data objects which are linked from the first data object via the second data objects and whose evaluation scores are influenced by a change in the evaluation score of the first data object at a ratio greater than or equal to a first threshold, based on the evaluation scores of the second data objects; and
    determining, by the processor and in response to a reference request to a fourth data object, the evaluation score of the fourth data object, based on the evaluation scores of data objects which link to the fourth data object via the third data objects and whose evaluation scores influence the evaluation score of the fourth data object at a ratio greater than or equal to a second threshold.

3. The evaluation method according to claim 2, further comprising changing, by the processor, the first threshold and second threshold, depending on how often a client device requests update of the evaluation score of data objects, as well as on how often the client device issues the reference request.

4. The evaluation method according to claim 3, wherein the changing of the first threshold and second threshold includes either raising the first threshold while reducing the second threshold, or reducing the first threshold while raising the second threshold.

5. The evaluation method according to claim 3, wherein the changing of the first threshold and second threshold includes maintaining a product of the first threshold and the second threshold at a constant level.

6. An information processing apparatus used to determine an evaluation score of one data object based on evaluation scores of and links in a related plurality of data objects, the links each permitting one data object to point to another data object, the information processing apparatus comprising:
- a memory configured to store the plurality of data objects and the evaluation scores thereof; and
- a processor configured to perform a procedure including:
- updating, in response to an update made to a first data object, the evaluation scores of one or more second data objects linked from at least the first data object and the evaluation scores of data objects which are linked from the first data object via the second data objects, based on the evaluation score of the first data object; and
- determining, in response to a reference request for one data object, the evaluation score of the requested data object, based on the evaluation scores of one or more third data objects having a link to the requested data object and the evaluation scores of data objects which link to the requested data object via the third data objects;
- wherein the updating includes selecting data objects, whose evaluation scores are to be updated, based on a ratio of a change in evaluation score of other data objects against a change in evaluation score of the first data object; and
- the determining includes selecting data objects, whose evaluation scores are to be used to determine the evaluation score of the requested data object, based on a ratio of how much part of evaluation scores of other data objects affects the evaluation score of the requested data object.

7. A computer-readable storage medium storing a program for determining an evaluation score of one data object based on evaluation scores of and links in related data objects, the links each permitting one data object to point to another data object, the program causing a computer to perform a procedure comprising:
- updating, in response to an update made to a first data object, the evaluation values scores of one or more second data objects linked from at least the first data object, based on the evaluation score of the first data object and the evaluation scores of data objects which are linked from the first data object via the second data objects; and
- determining, in response to a reference request for one data object, the evaluation score of the requested data object, based on the evaluation scores of one or more third data objects having a link to the requested data object and the evaluation scores of data objects which link to the requested data object via the third data objects;
- wherein the updating includes selecting data objects, whose evaluation scores are to be updated, based on a ratio of a change in evaluation score of other data objects against a change in evaluation score of the first data object; and
- the determining includes selecting data objects, whose evaluation scores are to be used to determine the evaluation score of the requested data object, based on a ratio of how much part of evaluation scores of other data objects affects the evaluation score of the requested data object.

* * * * *